US011490389B2

(12) United States Patent
Takahashi et al.

(10) Patent No.: US 11,490,389 B2
(45) Date of Patent: Nov. 1, 2022

(54) FLEXIBLE USE OF A BAND WITH A BANDWIDTH PROVIDED IN ACCORDANCE WITH CAPABILITY OF A TERMINAL

(71) Applicant: NTT DOCOMO, INC., Tokyo (JP)

(72) Inventors: Hideaki Takahashi, Tokyo (JP);
Kunihiko Teshima, Tokyo (JP);
Hiromasa Umeda, Tokyo (JP);
Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 653 days.

(21) Appl. No.: 16/336,966

(22) PCT Filed: Sep. 29, 2017

(86) PCT No.: PCT/JP2017/035503
§ 371 (c)(1),
(2) Date: Mar. 27, 2019

(87) PCT Pub. No.: WO2018/062494
PCT Pub. Date: Apr. 5, 2018

(65) Prior Publication Data
US 2021/0377933 A1   Dec. 2, 2021

(30) Foreign Application Priority Data

Sep. 29, 2016 (JP) .............................. JP2016-192357
Oct. 14, 2016 (JP) .............................. JP2016-203120

(51) Int. Cl.
*H04L 12/28* (2006.01)
*H04W 72/04* (2009.01)
*H04J 1/16* (2006.01)

(52) U.S. Cl.
CPC ..... *H04W 72/048* (2013.01); *H04W 72/0453* (2013.01)

(58) Field of Classification Search
CPC .... H04L 5/001; H04W 28/20; H04W 72/048; H04W 72/0453; H04W 28/00; H04W 56/001
(Continued)

(56) References Cited

U.S. PATENT DOCUMENTS 9,326,128 B2 *   4/2016   Ode ................. H04W 72/0406
10,674,550 B2 *  6/2020   Kim ..................... H04W 76/14
(Continued)

FOREIGN PATENT DOCUMENTS

EP     1906689 A1    4/2008
EP     2312895 A1    4/2011
(Continued)

OTHER PUBLICATIONS

Office Action issued in Japanese Application No. 2018-542935, dated Sep. 8, 2020 (7 pages).
(Continued)

*Primary Examiner* — John Pezzlo
(74) *Attorney, Agent, or Firm* — Osha Bergman Watanabe & Burton LLP

(57) ABSTRACT

A user equipment in a radio communication system including the user equipment and a base station, the user equipment including: a transmission unit that transmits a first maximum bandwidth, which is a maximum bandwidth available to the user equipment for communication, to the base station; and a reception unit that receives, from the base station, a center frequency or frequencies on both ends of a band having a bandwidth, which is equal to or less than the first maximum bandwidth, within a band having a second maximum bandwidth that is a maximum bandwidth available to the base station for communication.

10 Claims, 20 Drawing Sheets

(58) Field of Classification Search
USPC ................................. 370/252, 329, 430, 506
See application file for complete search history.

(56) References Cited

U.S. PATENT DOCUMENTS

| | | | | |
|---|---|---|---|---|
| 2009/0303941 | A1* | 12/2009 | Naka ................. | H04W 72/0406 |
| | | | | 370/329 |
| 2011/0194515 | A1 | 8/2011 | Nakao et al. | |
| 2011/0255493 | A1 | 10/2011 | Miki et al. | |
| 2016/0192366 | A1 | 6/2016 | Mizusawa | |
| 2016/0366618 | A1 | 12/2016 | Quan et al. | |
| 2017/0048719 | A1 | 2/2017 | Goto et al. | |
| 2017/0325172 | A1* | 11/2017 | Dinan ................. | H04W 52/365 |
| 2017/0325175 | A1* | 11/2017 | Dinan ................. | H04W 16/14 |
| 2018/0132200 | A1* | 5/2018 | Gheorghiu ........ | H04W 72/1289 |
| 2019/0110285 | A1* | 4/2019 | Huang ................. | H04W 72/04 |
| 2019/0297510 | A1 | 9/2019 | Maeda et al. | |
| 2019/0357239 | A1* | 11/2019 | Moon ................. | H04W 72/042 |

FOREIGN PATENT DOCUMENTS

| | | | | |
|---|---|---|---|---|
| EP | 2582175 | A1 | 4/2013 | |
| EP | 3 461 197 | A1 * | 7/2016 | ............ H04W 72/04 |
| JP | 2010114536 | A | 5/2010 | |
| JP | 2014168314 | A | 9/2014 | |
| JP | 2014216698 | A | 11/2014 | |
| JP | 2014-233073 | A | 12/2014 | |
| JP | 2015-159608 | A | 9/2015 | |
| WO | 2013/170699 | A1 | 11/2013 | |
| WO | 2014/027851 | A1 | 2/2014 | |
| WO | 2015/127592 | A1 | 9/2015 | |
| WO | 2015/163334 | A1 | 10/2015 | |
| WO | 2016/025836 | A1 | 2/2016 | |

OTHER PUBLICATIONS

Office Action issued in the counterpart Japanese Patent Application No. 2018-542935, dated Jan. 26, 2021 (5 pages).
Office Action issued in Algerian Application No. 190191, dated Nov. 22, 2020 (2 pages).
Office Action issued in the counterpart Australian Patent Application No. 2017337492, dated Jul. 23, 2021 (5 pages).
International Search Report issued in PCT/JP2017/035503 dated Dec. 19, 2017 (5 pages).
Written Opinion of the International Searching Authority issued in PCT/JP2017/035503 dated Dec. 19, 2017 (4 pages).
3GPP TS 36.104 V14.0.0; "3rd Generation Partnership Project; Technical Specification Group Radio Access Network Evolved Universal Terrestrial Radio Access (E-UTRA); Base Station (BS) radio transmission and reception (Release 14)"; Jun. 2016 (204 pages).
3GPP TS 36.331 V13.2.0; "3rd Generation Partnership Project; Technical Specification Group Radio Access Network Evolved Universal Terrestrial Radio Access (E-UTRA); Radio Resource Control (RRC); Protocol specification (Release 13)"; Jun. 2016 (623 pages).
3GPP TS 36.101 V14.0.0; "3rd Generation Partnership Project; Technical Specification Group Radio Access Network Evolved Universal Terrestrial Radio Access (E-UTRA); User Equipment (UE) radio transmission and reception Release 14)"; Jun. 2016 (1057 pages).
3GPP TS 36.300 V13.6.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 13)"; Dec. 2016 (314 pages).
3GPP TS 36.331 V13.4.0; "3rd Generation Partnership Project; Technical Specification Group Radio Access Network Evolved Universal Terrestrial Radio Access (E-UTRA); Radio Resource Control (RRC); Protocol specification (Release 13)"; Dec. 2016 (629 pages).
3GPP TS 36.101 V13.4.0; "3rd Generation Partnership Project; Technical Specification Group Radio Access Network Evolved Universal Terrestrial Radio Access (E-UTRA); User Equipment (UE) radio transmission and reception Release 13)"; Jun. 2016 (1035 pages).
Reconsideration Report issued in counterpart Japanese Application No. 2018-542935 dated Aug. 17, 2021 (4 pages).
Examination Report issued in Indian Application No. 201917012301 dated Aug. 31, 2021.
Extended European Search Report issued in the counterpart European Patent Application No. 17856443.1, dated Apr. 9, 2020 (11 pages).
Intel Corporation; "On UE bandwidth support in NR"; 3GPP TSG-RAN NR Adhoc #3 R4-1709407; Nagoya, Japan, Sep. 19-21, 2017 (5 pages).
Office Action issued in the counterpart Japanese Patent Application No. 2021-074224, dated Jul. 5, 2022 (6 pages).

* cited by examiner

FIG.4

| | *MasterInformationBlock* |
|---|---|

The *MasterInformationBlock* includes the system information transmitted on BCH.

Signalling radio bearer: N/A

RLC-SAP: TM

Logical channel: BCCH

Direction: E-UTRAN to UE

*MasterInformationBlock*

```
-- ASN1START

MasterInformationBlock ::=     SEQUENCE {
    dl-Bandwidth                   INTEGER (1..10000),
    phich-Config                   PHICH-Config,
    systemFrameNumber              BIT STRING (SIZE (8)),
    spare                          BIT STRING (SIZE (10))
}

-- ASN1STOP
```

| *MasterInformationBlock* field descriptions |
|---|
| dl-Bandwidth <br> Transmission bandwidth in downlink. Integer value 1 denotes 1 RB and value 2 denotes 2 RBs and so on. |
| systemFrameNumber <br> Defines the 8 most significant bits of the SFN, see TS 36.211 [21, 6.6.1]. The 2 least significant bits of the SFN are acquired implicitly in the P-BCH decoding, i.e. timing of 40ms P-BCH TTI indicates 2 least significant bits (within 40ms P-BCH TTI, the first radio frame: 00, the second radio frame: 01, the third radio frame: 10, the last radio frame: 11). |

SystemInformationBlockType2

The IE *SystemInformationBlockType2* contains radio resource configuration information that is common for all UEs.

NOTE:  UE timers and constants related to functionality for which parameters are provided in another SIB are included in the corresponding SIB.

SystemInformationBlockType2 information element

```
-- ASN1START

SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig        OPTIONAL,   -- Need OP
        ac-BarringForMO-Data                AC-BarringConfig        OPTIONAL    -- Need OP
    }                                                               OPTIONAL,   -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA        OPTIONAL,   -- Need OP
        ul-Bandwidth                        INTEGER (1..10000)      OPTIONAL,   -- Need OP
        additionalSpectrumEmission          AdditionalSpectrumEmission
    },
    mbsfn-SubframeConfigList            MBSFN-SubframeConfigList    OPTIONAL,   -- Need OR
    timeAlignmentTimerCommon            TimeAlignmentTimer,
    ...,
    lateNonCriticalExtension            OCTET STRING (CONTAINING SystemInformationBlockType2-v8h0-IEs)
                    OPTIONAL -- Need OP
}

SystemInformationBlockType2-v8h0-IEs ::=    SEQUENCE {
    multiBandInfoList               SEQUENCE (SIZE (1..maxMultiBands)) OF AdditionalSpectrumEmission
    OPTIONAL, -- Need OR
    nonCriticalExtension            SEQUENCE {}                     OPTIONAL    -- Need OP
}

AC-BarringConfig ::=        SEQUENCE {
    ac-BarringFactor            ENUMERATED {
                                    p00, p05, p10, p15, p20, p25, p30, p40,
                                    p50, p60, p70, p75, p80, p85, p90, p95},
    ac-BarringTime              ENUMERATED {s4, s8, s16, s32, s64, s128, s256, s512},
    ac-BarringForSpecialAC      BIT STRING (SIZE(5))
}

MBSFN-SubframeConfigList ::=    SEQUENCE (SIZE (1..maxMBSFN-Allocations)) OF MBSFN-
SubframeConfig MBSFN-SubframeConfig ::=    SEQUENCE {
    radioframeAllocationPeriod      ENUMERATED {n1, n2, n4, n8, n16, n32},
    radioframeAllocationOffset      INTEGER (0..7),
    subframeAllocation              CHOICE {
        oneFrame                        BIT STRING (SIZE(6)),
        fourFrames                      BIT STRING (SIZE(24))
    }
}
-- ASN1STOP
```

FIG.6

| SystemInformationBlockType2 field descriptions |
|---|
| *ac-BarringForEmergency*<br>Access class barring for AC 10. |
| *ac-BarringForMO-Signalling*<br>Access class barring for mobile originating signalling. |
| *ac-BarringForMO-Data*<br>Access class barring for mobile originating calls. |
| *ac-BarringFactor*<br>If the random number drawn by the UE is lower than this value, access is allowed. Otherwise the access is barred. The values are interpreted in the range [0,1]: p00 = 0, p05 = 0.05, p10 = 0.10,...,p95 = 0.95. Values other than 'p00' can only be set if all bits of the corresponding *ac-BarringForSpecialAC* are set to 0. |
| *ac-BarringTime*<br>Mean access barring time value in seconds. |
| *ac-BarringForSpecialAC*<br>Access class barring for AC 11-15. The first/ leftmost bit is for AC 11, the second bit is for AC 12, and so on. |
| *ul-CarrierFreq*<br>For FDD: If absent, the (default) value determined from the default TX-RX frequency separation defined in TS 36.101 [42, table 5.7.3-1] applies.<br>For TDD: This parameter is absent and it is equal to the downlink frequency. |
| *ul-Bandwidth*<br><u>Transmission bandwidth in uplink. Integer value 1 denotes 1 RB and value 2 denotes 2 RBs and so on.</u> |
| *mbsfn-SubframeConfigList*<br>Defines the subframes that are reserved for MBSFN in downlink. |
| *multiBandInfoList*<br>A list of *additionalSpectrumEmission* i.e. one for each additional frequency band included in *multiBandInfoList* in *SystemInformationBlockType1*, listed in the same order. |
| *radioFrameAllocationPeriod, radioFrameAllocationOffset*<br>Radio-frames that contain MBSFN subframes occur when equation SFN mod *radioFrameAllocationPeriod* = *radioFrameAllocationOffset* is satisfied. Value n1 for *radioframeAllocationPeriod* denotes value 1, n2 denotes value 2, and so on. When *fourFrames* is used for *subframeAllocation*, the equation defines the first radio frame referred to in the description below. Values *n1* and *n2* are not applicable when *fourFrames* is used. |
| *subframeAllocation*<br>Defines the subframes that are allocated for MBSFN within the radio frame allocation period defined by the *radioFrameAllocationPeriod* and the *radioFrameAllocationOffset*. |
| *oneFrame*<br>"1" denotes that the corresponding subframe is allocated for MBSFN. The following mapping applies:<br>FDD: The first/leftmost bit defines the MBSFN allocation for subframe #1, the second bit for #2, third bit for #3 , fourth bit for #6, fifth bit for #7, sixth bit for #8.<br>TDD: The first/leftmost bit defines the allocation for subframe #3, the second bit for #4, third bit for #7, fourth bit for #8, fifth bit for #9. Uplink subframes are not allocated. The last bit is not used. |
| *fourFrames*<br>A bit-map indicating MBSFN subframe allocation in four consecutive radio frames, "1" denotes that the corresponding subframe is allocated for MBSFN. The bitmap is interpreted as follows:<br>FDD: Starting from the first radioframe and from the first/leftmost bit in the bitmap, the allocation applies to subframes #1, #2, #3 , #6, #7, and #8 in the sequence of the four radio-frames.<br>TDD: Starting from the first radioframe and from the first/leftmost bit in the bitmap, the allocation applies to subframes #3, #4, #7, #8, and #9 in the sequence of the four radio-frames. The last four bits are not used. Uplink subframes are not allocated. |

FIG.7

— MasterInformationBlock

The *MasterInformationBlock* includes the system information transmitted on BCH.

Signalling radio bearer: N/A

RLC-SAP: TM

Logical channel: BCCH

Direction: E-UTRAN to UE

MasterInformationBlock

```
-- ASN1START

MasterInformationBlock ::=       SEQUENCE {
    dl-Bandwidth                     INTEGER (1..64),
    phich-Config                     PHICH-Config,
    systemFrameNumber                BIT STRING (SIZE (8)),
    spare                            BIT STRING (SIZE (10))
}

-- ASN1STOP
```

| *MasterInformationBlock* field descriptions |
|---|
| dl-Bandwidth <br> Transmission bandwidth in downlink. The actual bandwidth in a unit of RB is derived by (25 * IE value). |
| systemFrameNumber <br> Defines the 8 most significant bits of the SFN, see TS 36.211 [21, 6.6.1]. The 2 least significant bits of the SFN are acquired implicitly in the P-BCH decoding, i.e. timing of 40ms P-BCH TTI indicates 2 least significant bits (within 40ms P-BCH TTI, the first radio frame: 00, the second radio frame: 01, the third radio frame: 10, the last radio frame: 11). |

FIG.8

— *SystemInformationBlockType2*

The IE *SystemInformationBlockType2* contains radio resource configuration information that is common for all UEs.

NOTE:  UE timers and constants related to functionality for which parameters are provided in another SIB are included in the corresponding SIB.

*SystemInformationBlockType2* information element

```
-- ASN1START

SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig           OPTIONAL,    -- Need OP
        ac-BarringForMO-Data                AC-BarringConfig           OPTIONAL,    -- Need OP
    }                                                                  OPTIONAL,    -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA           OPTIONAL,    -- Need OP
        ul-Bandwidth                        INTEGER (1..64)            OPTIONAL,    -- Need OP
        additionalSpectrumEmission          AdditionalSpectrumEmission
    },
    mbsfn-SubframeConfigList            MBSFN-SubframeConfigList       OPTIONAL,    -- Need OR
    timeAlignmentTimerCommon            TimeAlignmentTimer,
    ...,
    lateNonCriticalExtension            OCTET STRING (CONTAINING SystemInformationBlockType2-v8h0-IEs)
                OPTIONAL    -- Need OP
}

SystemInformationBlockType2-v8h0-IEs ::=    SEQUENCE {
    multiBandInfoList               SEQUENCE (SIZE (1..maxMultiBands)) OF AdditionalSpectrumEmission
        OPTIONAL, -- Need OR
    nonCriticalExtension            SEQUENCE {}                        OPTIONAL    -- Need OP
}

AC-BarringConfig ::=                SEQUENCE {
    ac-BarringFactor                    ENUMERATED {
                                            p00, p05, p10, p15, p20, p25, p30, p40,
                                            p50, p60, p70, p75, p80, p85, p90, p95},
    ac-BarringTime                      ENUMERATED {s4, s8, s16, s32, s64, s128, s256, s512},
    ac-BarringForSpecialAC              BIT STRING (SIZE(5))
}

MBSFN-SubframeConfigList ::=        SEQUENCE (SIZE (1..maxMBSFN-Allocations)) OF MBSFN-
SubframeConfig MBSFN-SubframeConfig ::=            SEQUENCE {
    radioframeAllocationPeriod          ENUMERATED {n1, n2, n4, n8, n16, n32},
    radioframeAllocationOffset          INTEGER (0..7),
    subframeAllocation                  CHOICE {
        oneFrame                            BIT STRING (SIZE(6)),
        fourFrames                          BIT STRING (SIZE(24))
    }
}
-- ASN1STOP
```

FIG.9

| SystemInformationBlockType2 field descriptions |
|---|
| *ac-BarringForEmergency*<br>Access class barring for AC 10. |
| *ac-BarringForMO-Signalling*<br>Access class barring for mobile originating signalling. |
| *ac-BarringForMO-Data*<br>Access class barring for mobile originating calls. |
| *ac-BarringFactor*<br>If the random number drawn by the UE is lower than this value, access is allowed. Otherwise the access is barred. The values are interpreted in the range [0,1]: p00 = 0, p05 = 0.05, p10 = 0.10,...,p95 = 0.95. Values other than 'p00' can only be set if all bits of the corresponding *ac-BarringForSpecialAC* are set to 0. |
| *ac-BarringTime*<br>Mean access barring time value in seconds. |
| *ac-BarringForSpecialAC*<br>Access class barring for AC 11-15. The first/ leftmost bit is for AC 11, the second bit is for AC 12, and so on. |
| *ul-CarrierFreq*<br>For FDD: If absent, the (default) value determined from the default TX-RX frequency separation defined in TS 36.101 [42, table 5.7.3-1] applies.<br>For TDD: This parameter is absent and it is equal to the downlink frequency. |
| *ul-Bandwidth*<br>Transmission bandwidth in downlink. The actual bandwidth in a unit of RB is derived by (25 * IE value). |
| *mbsfn-SubframeConfigList*<br>Defines the subframes that are reserved for MBSFN in downlink. |
| *multiBandInfoList*<br>A list of *additionalSpectrumEmission* i.e. one for each additional frequency band included in *multiBandInfoList* in *SystemInformationBlockType1*, listed in the same order. |
| *radioFrameAllocationPeriod, radioFrameAllocationOffset*<br>Radio-frames that contain MBSFN subframes occur when equation SFN mod *radioFrameAllocationPeriod* = *radioFrameAllocationOffset* is satisfied. Value n1 for *radioframeAllocationPeriod* denotes value 1, n2 denotes value 2, and so on. When *fourFrames* is used for *subframeAllocation*, the equation defines the first radio frame referred to in the description below. Values *n1* and *n2* are not applicable when *fourFrames* is used. |
| *subframeAllocation*<br>Defines the subframes that are allocated for MBSFN within the radio frame allocation period defined by the *radioFrameAllocationPeriod* and the *radioFrameAllocationOffset*. |
| *oneFrame*<br>"1" denotes that the corresponding subframe is allocated for MBSFN. The following mapping applies:<br>FDD: The first/leftmost bit defines the MBSFN allocation for subframe #1, the second bit for #2, third bit for #3 , fourth bit for #6, fifth bit for #7, sixth bit for #8.<br>TDD: The first/leftmost bit defines the allocation for subframe #3, the second bit for #4, third bit for #7, fourth bit for #8, fifth bit for #9. Uplink subframes are not allocated. The last bit is not used. |
| *fourFrames*<br>A bit-map indicating MBSFN subframe allocation in four consecutive radio frames, "1" denotes that the corresponding subframe is allocated for MBSFN. The bitmap is interpreted as follows:<br>FDD: Starting from the first radioframe and from the first/leftmost bit in the bitmap, the allocation applies to subframes #1, #2, #3 , #6, #7, and #8 in the sequence of the four radio-frames.<br>TDD: Starting from the first radioframe and from the first/leftmost bit in the bitmap, the allocation applies to subframes #3, #4, #7, #8, and #9 in the sequence of the four radio-frames. The last four bits are not used. Uplink subframes are not allocated. |

| – | *MasterInformationBlock* |
|---|---|

The *MasterInformationBlock* includes the system information transmitted on BCH.

Signalling radio bearer: N/A

RLC-SAP: TM

Logical channel: BCCH

Direction: E-UTRAN to UE

*MasterInformationBlock*

```
-- ASN1START

MasterInformationBlock ::=       SEQUENCE {
    dl-Bandwidth                     INTEGER (0..63),
    phich-Config                     PHICH-Config,
    systemFrameNumber                BIT STRING (SIZE (8)),
    spare                            BIT STRING (SIZE (10))
}

-- ASN1STOP
```

| *MasterInformationBlock* field descriptions |
|---|
| *dl-Bandwidth* |
| Transmission bandwidth in downlink. The actual bandwidth in a unit of RB is derived by (25 * 2^(IE value)). |
| *systemFrameNumber* |
| Defines the 8 most significant bits of the SFN, see TS 36.211 [21, 6.6.1]. The 2 least significant bits of the SFN are acquired implicitly in the P-BCH decoding, i.e. timing of 40ms P-BCH TTI indicates 2 least significant bits (within 40ms P-BCH TTI, the first radio frame: 00, the second radio frame: 01, the third radio frame: 10, the last radio frame: 11). |

FIG.11

```
-            SystemInformationBlockType2
```

The IE *SystemInformationBlockType2* contains radio resource configuration information that is common for all UEs.

NOTE:   UE timers and constants related to functionality for which parameters are provided in another SIB are included in the corresponding SIB.

SystemInformationBlockType2 information element

```
-- ASN1START

SystemInformationBlockType2 ::=    SEQUENCE {
    ac-BarringInfo                 SEQUENCE {
        ac-BarringForEmergency         BOOLEAN,
        ac-BarringForMO-Signalling     AC-BarringConfig              OPTIONAL,   -- Need OP
        ac-BarringForMO-Data           AC-BarringConfig              OPTIONAL    -- Need OP
    }                                                                OPTIONAL,   -- Need OP
    radioResourceConfigCommon      RadioResourceConfigCommonSIB,
    ue-TimersAndConstants          UE-TimersAndConstants,
    freqInfo                       SEQUENCE {
        ul-CarrierFreq                 ARFCN-ValueEUTRA              OPTIONAL,   -- Need OP
        ul-Bandwidth                   INTEGER (0..63)               OPTIONAL,   -- Need OP
        additionalSpectrumEmission     AdditionalSpectrumEmission
    },
    mbsfn-SubframeConfigList       MBSFN-SubframeConfigList          OPTIONAL,   -- Need OR
    timeAlignmentTimerCommon       TimeAlignmentTimer,
    ...,
    lateNonCriticalExtension       OCTET STRING (CONTAINING SystemInformationBlockType2-v8h0-IEs)
                  OPTIONAL -- Need OP
}

SystemInformationBlockType2-v8h0-IEs ::=    SEQUENCE {
    multiBandInfoList              SEQUENCE (SIZE (1..maxMultiBands)) OF AdditionalSpectrumEmission
    OPTIONAL, -- Need OR
    nonCriticalExtension           SEQUENCE {}                       OPTIONAL    -- Need OP
}

AC-BarringConfig ::=              SEQUENCE {
    ac-BarringFactor                  ENUMERATED {
                                          p00, p05, p10, p15, p20, p25, p30, p40,
                                          p50, p60, p70, p75, p80, p85, p90, p95},
    ac-BarringTime                    ENUMERATED {s4, s8, s16, s32, s64, s128, s256, s512},
    ac-BarringForSpecialAC            BIT STRING (SIZE(5))
}

MBSFN-SubframeConfigList ::=      SEQUENCE (SIZE (1..maxMBSFN-Allocations)) OF MBSFN-
SubframeConfig MBSFN-SubframeConfig ::=          SEQUENCE {
    radioframeAllocationPeriod        ENUMERATED {n1, n2, n4, n8, n16, n32},
    radioframeAllocationOffset        INTEGER (0..7),
    subframeAllocation                CHOICE {
        oneFrame                          BIT STRING (SIZE(6)),
        fourFrames                        BIT STRING (SIZE(24))
    }
}
-- ASN1STOP
```

FIG.12

| SystemInformationBlockType2 field descriptions |
|---|
| ac-BarringForEmergency<br>Access class barring for AC 10. |
| ac-BarringForMO-Signalling<br>Access class barring for mobile originating signalling. |
| ac-BarringForMO-Data<br>Access class barring for mobile originating calls. |
| ac-BarringFactor<br>If the random number drawn by the UE is lower than this value, access is allowed. Otherwise the access is barred. The values are interpreted in the range [0,1]: p00 = 0, p05 = 0.05, p10 = 0.10,...,p95 = 0.95. Values other than 'p00' can only be set if all bits of the corresponding *ac-BarringForSpecialAC* are set to 0. |
| ac-BarringTime<br>Mean access barring time value in seconds. |
| ac-BarringForSpecialAC<br>Access class barring for AC 11-15. The first/ leftmost bit is for AC 11, the second bit is for AC 12, and so on. |
| ul-CarrierFreq<br>For FDD: If absent, the (default) value determined from the default TX-RX frequency separation defined in TS 36.101 [42, table 5.7.3-1] applies.<br>For TDD: This parameter is absent and it is equal to the downlink frequency. |
| ul-Bandwidth<br><u>Transmission bandwidth in downlink. The actual bandwidth in a unit of RB is derived by (25 * 2^(IE value)).</u> |
| mbsfn-SubframeConfigList<br>Defines the subframes that are reserved for MBSFN in downlink. |
| multiBandInfoList<br>A list of *additionalSpectrumEmission* i.e. one for each additional frequency band included in *multiBandInfoList* in *SystemInformationBlockType1*, listed in the same order. |
| radioFrameAllocationPeriod, radioFrameAllocationOffset<br>Radio-frames that contain MBSFN subframes occur when equation *SFN* mod *radioFrameAllocationPeriod* = *radioFrameAllocationOffset* is satisfied. Value n1 for *radioFrameAllocationPeriod* denotes value 1, n2 denotes value 2, and so on. When *fourFrames* is used for *subframeAllocation*, the equation defines the first radio frame referred to in the description below. Values n1 and n2 are not applicable when *fourFrames* is used. |
| subframeAllocation<br>Defines the subframes that are allocated for MBSFN within the radio frame allocation period defined by the *radioFrameAllocationPeriod* and the *radioFrameAllocationOffset*. |
| oneFrame<br>"1" denotes that the corresponding subframe is allocated for MBSFN. The following mapping applies:<br>FDD: The first/leftmost bit defines the MBSFN allocation for subframe #1, the second bit for #2, third bit for #3 , fourth bit for #6, fifth bit for #7, sixth bit for #8.<br>TDD: The first/leftmost bit defines the allocation for subframe #3, the second bit for #4, third bit for #7, fourth bit for #8, fifth bit for #9. Uplink subframes are not allocated. The last bit is not used. |
| fourFrames<br>A bit-map indicating MBSFN subframe allocation in four consecutive radio frames, "1" denotes that the corresponding subframe is allocated for MBSFN. The bitmap is interpreted as follows:<br>FDD: Starting from the first radioframe and from the first/leftmost bit in the bitmap, the allocation applies to subframes #1, #2, #3 , #6, #7, and #8 in the sequence of the four radio-frames.<br>TDD: Starting from the first radioframe and from the first/leftmost bit in the bitmap, the allocation applies to subframes #3, #4, #7, #8, and #9 in the sequence of the four radio-frames. The last four bits are not used. Uplink subframes are not allocated. |

FLEXIBLE USE OF A BAND WITH A BANDWIDTH PROVIDED IN ACCORDANCE WITH CAPABILITY OF A TERMINAL

TECHNICAL FIELD

The present invention relates to a user equipment and a base station in a radio communication system.

BACKGROUND ART

Currently, in a $3^{rd}$ generation partnership project (3GPP), a next generation system, which corresponds to a successor of long term evolution (LTE)-Advanced as one of fourth generation radio communication systems and is called 5G, has been examined. In the 5G, for example, the following use cases such as an extended mobile broadband (eMBB), a massive machine type communication (mMTC), and an ultra reliability and low latency communication (URLLC) are assumed.

CITATION LIST

Non-Patent Document

Non-Patent Document 1: 3GPP TS 36.104 V14.0.0 (2016-06)
Non-Patent Document 2: 3GPP TS 36.331 V13.2.0 (2016-06)
Non-Patent Document 3: 3GPP TS 36.101 V14.0.0 (2016-06)

SUMMARY OF THE INVENTION

Problem to be Solved by the Invention

In the radio communication system in 5G in which various use cases as described above are assumed, in each of a downlink (DL) and an uplink (UL), it is preferable to use an arbitrary bandwidth from a narrow bandwidth (for example, 1 RB (180 KHz) of LTE) to an ultra-broad bandwidth (for example, a width of 5 GHz).

However, in existing LTE (including LTE-Advance), as a channel bandwidth, six-pattern bandwidths including 1.4 MHz, 3 MHz, 5 MHz, 10 MHz, 15 MHz, and 20 MHz are defined (Non-Patent Document 1), and any one channel bandwidth among the channel bandwidths is used in each cell. In addition, a user equipment, which is resident in a certain cell, uses a channel bandwidth that is used in the cell. In this situation, in a case where a band having a broad bandwidth (for example, 800 MHz) is allocated to a service provider, and an operation is performed by using the band, for example, it is considered that the band is divided into 40 carriers having a bandwidth of 20 MHz, and carrier aggregation (CA) with 40 CCs to the maximum is performed. However, in a case where the CA with the 40 CCs to the maximum is defined, it is considered that it is necessary for the user equipment to notify the base station of capability relating to a band combination related to very many combinations in order for the user equipment to carry out the CA corresponding to capability of the user equipment, and there is a possibility that system capability decreases due to an increase in a signaling amount.

So as to avoid occurrence of the above-described problem, in 5G, it is preferable that the user equipment can flexibly use a band (for example, a band that is allocated to the service provider and is supported by the base station) with a bandwidth provided in a radio communication system in accordance with capability of the user equipment even not performing the CA.

The present invention has been made in consideration of the above-described circumstances, and an object there is to provide a technology capable of allowing a user equipment to flexibly use a band with a bandwidth provided in a radio communication system in accordance with capability of the user equipment.

Means for Solving Problem

According to a technology that is disclosed, there is provided a user equipment in a radio communication system including the user equipment and a base station. The user equipment includes: a transmission unit that transmits a first maximum bandwidth, which is a maximum bandwidth available to the user equipment in a communication, to the base station; and a reception unit that receives, from the base station, a center frequency or frequencies on both ends of a band having a bandwidth, which is equal to or less than the first maximum bandwidth, in a band having a second maximum bandwidth that is a maximum bandwidth available to the base station in a communication.

Effect of the Invention

According to the technology that is disclosed, it is possible to provide a technology capable of allowing a user equipment to flexibly use a band with a bandwidth provided in a radio communication system in accordance with capability of the user equipment.

BRIEF DESCRIPTION OF DRAWINGS

FIG. 4 is a view illustrating an example of a specification form corresponding to Method Example 1 of giving a notification of an available maximum bandwidth supported by a base station 20;

FIG. 5 is a view illustrating an example of a specification form corresponding to Method Example 1 of giving a notification of the available maximum bandwidth supported by the base station 20;

FIG. 6 is a view illustrating an example of a specification form corresponding to Method Example 1 of giving a notification of the available maximum bandwidth supported by the base station 20;

FIG. 7 is a view illustrating an example of a specification form corresponding to Method Example 2 of giving a notification of the available maximum bandwidth supported by the base station 20;

FIG. 8 is a view illustrating an example of a specification form corresponding to Method Example 2 of giving a notification of the available maximum bandwidth supported by the base station 20;

FIG. 9 is a view illustrating an example of a specification form corresponding to Method Example 2 of giving a notification of the available maximum bandwidth supported by the base station 20;

FIG. 10 is a view illustrating an example of a specification form corresponding to Method Example 3 of giving a notification of the available maximum bandwidth supported by the base station 20;

FIG. 11 is a view illustrating an example of a specification form corresponding to Method Example 3 of giving a notification of the available maximum bandwidth supported by the base station 20;

FIG. 12 is a view illustrating an example of a specification form corresponding to Method Example 3 of giving a notification of the available maximum bandwidth supported by the base station 20;

MODE(S) FOR CARRYING OUT THE INVENTION

Hereinafter, an embodiment (this embodiment) of the invention will be described with reference to the accompanying drawings. Furthermore, the following embodiment is illustrative only, and an embodiment to which the invention is applied is not limited to the following embodiment.

A base station 20 and a user equipment 10 in a radio communication system of this embodiment can perform an operation based on a communication mode of LTE (including LTE-Advanced, and 5G that is a successor thereof) as long as inconsistency from a technology described in this embodiment does not occur. Accordingly, an existing technology defined in LTE can be appropriately used when the radio communication operates. However, the existing technology is not limited to LTE. In addition, the invention is also applicable to a communication mode other than LTE.

In addition, in the following embodiment, terms such as P-BCH, MIB, and SIB2, which are used in LTE, are used. However, the terms are illustrative only, and the terms may be called other names such as a channel and a signal which have the same function.

(System Whole Configuration)

Figure 1:
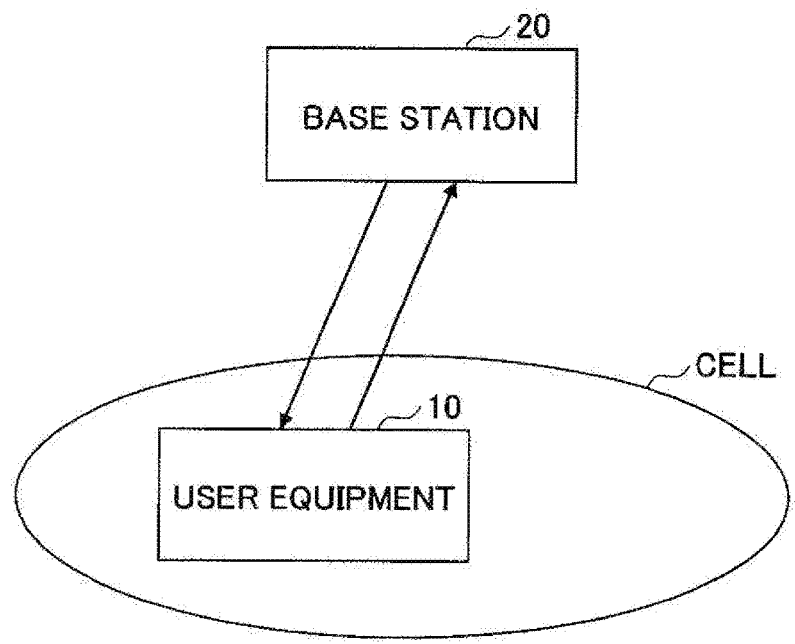
FIG. 1 is a configuration diagram of a radio communication system according to an embodiment of the invention.

FIG. 1 illustrates a configuration diagram of the radio communication system according to this embodiment. As illustrated in FIG. 1, the radio communication system according to this embodiment includes a user equipment 10 and a base station 20. In FIG. 1, the user equipment 10 and the base station 20 are illustrated one by one. However, this is illustrative only, and the user equipment 10 and the base station 20 may be respectively provided in a plural number. In addition, the base station 20 may include one or a plurality of remote radio heads (RRH).

(Overview of Bandwidth)

Description will be given of an overview of matters relating to a bandwidth that is used in the radio communication system according to this embodiment with reference to FIG. 2.

As described above, in LTE, only six patterns are defined as a channel bandwidth, and thus a channel bandwidth that is supported in each of the user equipment and the base station is limited to the six patterns. When utilizing existing radio transmission and reception technology, it is possible to support a bandwidth other than the six patterns in LTE as a channel bandwidth in the user equipment and the base station, but the channel bandwidth defined in LTE includes six patterns. Accordingly, in LTE, the channel bandwidth supported in each of the user equipment and the base station is limited to the six patterns.

On the other hand, in the radio communication system according to this embodiment, a channel bandwidth of a limited pattern similar to LTE is not provided, and each of the user equipment 10 and the base station 20 is configured to support an arbitrary bandwidth from a narrow bandwidth to an ultra-broad bandwidth (for example, 5 GHZ). Here, for example, the narrow bandwidth is a minimum scheduling unit of the radio communication system in this embodiment. For example, the minimum scheduling unit may be 180 KHz that is a bandwidth of 1 resource block (RB) in LTE.

In this embodiment, an "available maximum bandwidth", which is available to the user equipment 10 and the base station 20 in a communication, is used. The user equipment 10 and the base station 20 can perform a communication by using a band having a bandwidth equal to or less than the available maximum bandwidth.

The "available maximum bandwidth" may be referred to as a transmission bandwidth configuration. In addition, a bandwidth in which a guard band is added on both sides of the "available maximum bandwidth" may be referred to as a "channel bandwidth". In addition, the "available maximum bandwidth" may be referred to as a "channel bandwidth". In addition, the "available maximum bandwidth" may be substituted with any one term of "transmission bandwidth", "reception bandwidth", "transmission and reception bandwidth", "maximum bandwidth", "maximum transmission bandwidth", "maximum reception bandwidth", "maximum transmission and reception bandwidth", and "system bandwidth". In addition, the "available maximum bandwidth" may be substituted with any name other than the above-described terms.

Figure 2:
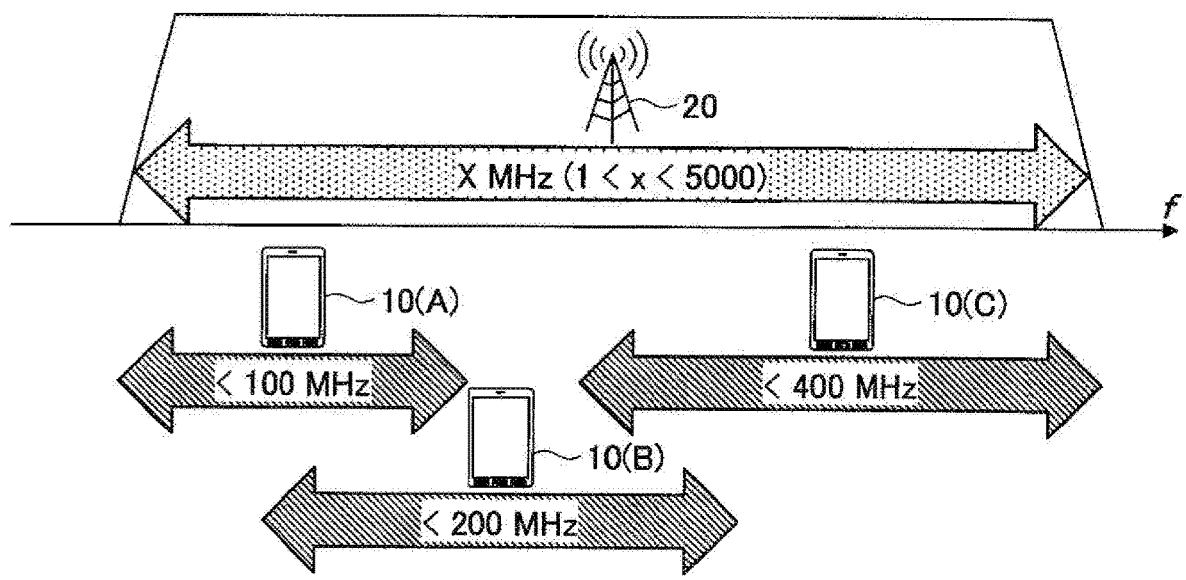
FIG. 2 is a view illustrating an overview of an available maximum bandwidth that is used in a radio communication system according to the embodiment of the invention.

FIG. 2 illustrates a use example of the available maximum bandwidth in the radio communication system according to this embodiment. Furthermore, the available maximum bandwidth illustrated in FIG. 2 may be interpreted as an available maximum bandwidth of a DL, an available maximum bandwidth of a UL, or an available maximum bandwidth that is common to the DL and the UL (for example, in a case of TDD).

In the example of FIG. 2, the base station 20 supports the available maximum bandwidth of XMHz (X is a predetermined number). For example, a value of the available maximum bandwidth is any one value in a range of 1<x<5000 (MHz). In this case, 1 is the minimum value and 5000 is the maximum value. The minimum value and the maximum value may be determined in advance in accordance with specifications.

In addition, in the example of FIG. 2, a user equipment 10(A) supports an available maximum bandwidth of 100 MHz, a user equipment 10(B) supports an available maximum bandwidth of 200 MHz, and a user equipment 10(C) supports an available maximum bandwidth of 400 MHz.

Each user equipment 10 performs a communication with the base station 20 by using a bandwidth in a range of the available maximum bandwidth of the user equipment 10. For example, the user equipment 10(C) can perform a communication with the base station 20 by using a bandwidth (for example, 400 MHz, 200 MHz, and the like) that is equal to or less than 400 MHz in accordance with resource allocation from the base station 20.

As described above, the available maximum bandwidth can be set to an arbitrary bandwidth, and granularity is, for example, a unit of 1 RB (for example, 180 KHz), a unit of 1 MHz, or a channel raster (100 KHz). In addition, other values may be set as the granularity.

In addition, in the radio communication system according to this embodiment, with regard to the number (X) of FFT points, an arbitrary integer may be taken in a predetermined range such as $1 \leq X \leq N$ (for example, N is 524288). In addition, a spectrum mask is defined as a function of a bandwidth X, and the user equipment 10 can calculate and apply the spectrum mask from a bandwidth that is used by using the function.

Hereinafter, an operation example and the like of the radio communication system according to this embodiment will be described in more detail.

Flow of Whole Operation

Figure 3:
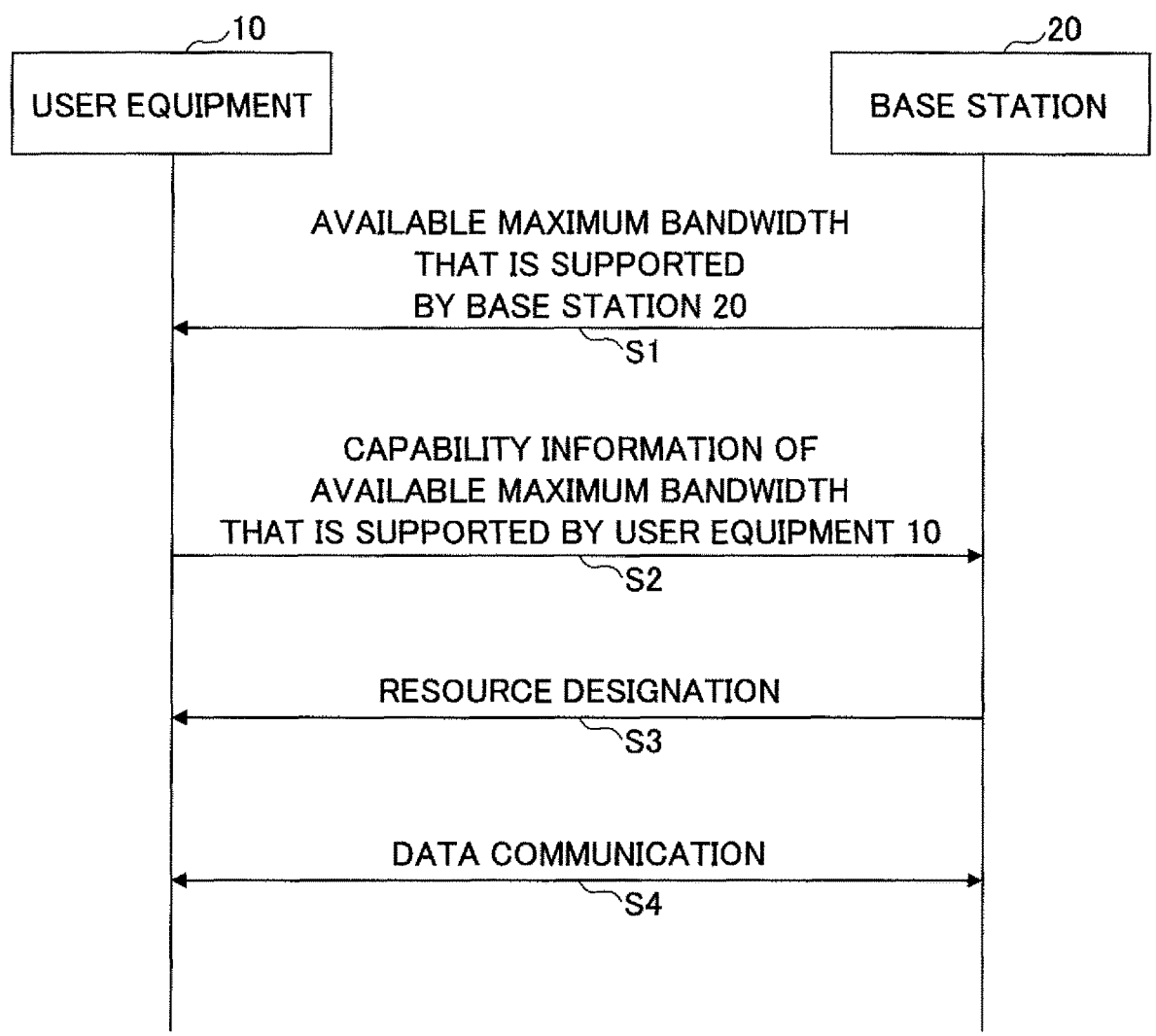
FIG. 3 is a sequence diagram illustrating a whole flow of an operation in the radio communication system according to the embodiment of the invention.

Description will be given of an example of a whole flow of an operation in the radio communication system according to this embodiment with reference to a sequence diagram of FIG. 3.

In step S1, the base station 20 notifies the user equipment 10 of an available maximum bandwidth that is supported by the base station 20. In this embodiment, the notification is performed through broadcast of system information. However, the notification may be performed by using an individual channel to each user equipment. In addition, in step S1, the notification of the available maximum bandwidth may be performed with respect to each of an available maximum bandwidth of the DL and an available maximum bandwidth of the UL, or with respect to any one of the available maximum bandwidth of the DL and the available maximum bandwidth of the UL. In addition, in a case where the available maximum bandwidth of the UL and the available maximum bandwidth of the DL are the same as each other, notification of the available maximum bandwidth may be performed without discrimination of the UL and the DL.

As an example, the user equipment 10, which receives the available maximum bandwidth that is supported by the base station 20 from the base station 20, can determine whether or not to reside in a cell of the base station 20. For example, in a case where the base station 20 supports only an available maximum bandwidth that is smaller than a bandwidth necessary for a communication, it is considered that the user equipment 10 may make a determination as not being resident in the cell. Furthermore, as to be described later, even in this case, the user equipment 10 can perform a communication in a state of being resident in the cell. In addition, in a case where a band (frequency) that is not supported by the user equipment 10 is present in a band having the available maximum bandwidth that is supported by the base station 20, the user equipment 10, which receives the available maximum bandwidth that is supported by the base station 20 from the base station 20, may give a notification of the band (frequency) in step S2. In this case, the base station 20 may allocate a resource except for the band that is not supported by the user equipment 10.

In addition, in this embodiment, as to be described later, when the user equipment 10 is notified of a center frequency from the base station 20, the user equipment 10 can grasp a range of resources, for example, by the center frequency and the available maximum bandwidth of the user equipment 10. Accordingly, step S1 may not be performed.

In step S2, the user equipment 10 reports capability information (UE capability) of the available maximum bandwidth supported by the user equipment 10, to the base station 20. Reporting of the available maximum bandwidth in step S2 may be performed with respect to each of the available maximum bandwidth of the DL and the available maximum bandwidth of the UL, or may be performed with respect to any one of the available maximum bandwidth of the DL and the available maximum bandwidth of the UL. In addition, in a case where the available maximum bandwidth is the same between UL and DL, reporting of the capability information of the available maximum bandwidth (which is common to the UL and the DL) may be performed without discrimination of the UL and the DL.

In step S3, for example, the base station 20 performs setting of a sub-band and a center frequency to be described later on the basis of the available maximum bandwidth supported by the base station 20 and the available maximum bandwidth supported by the user equipment 10, and gives an instruction of (allocates) a resource in a sub-band, which is used by the user equipment 10 in a communication, to the user equipment 10. For example, the instruction is performed by a physical downlink control channel (PDCCH). In step S4, the user equipment 10 performs a communication with the base station 20 by using the resource that is given in the instruction from the base station 20 (for example, performs data transmission or data reception).

Note that, the resource that is used in information notification in steps S1, S2, and S3 may be a resource that is determined in advance, a contention-based resource that is arbitrarily selected, a resource that is allocated to the user equipment 10 through certain signaling, or a resource other than these resources.

Hereinafter, an example of processing contents of each of step S1, step S2, and step S3 in more detail.

(Step S1: Broadcast of Available Maximum Bandwidth from Base Station 20)

As described above, in step S1, the base station 20 transmits a value of the available maximum bandwidth supported by the base station 20 by broadcasting. As an example, the base station 20 transmits a value of the available maximum bandwidth of the DL with a P-BCH (MIB), and transmits a value of the available maximum bandwidth of the UL with an SIB2. Examples of a method of giving a notification of (method of expressing) the available maximum bandwidth include the following three examples in this embodiment.

Example 1 of Available Maximum Bandwidth Notification

In Example 1, the available maximum bandwidth is expressed by an integer value in a unit of 1 RB. For example, the integer value is a value in a range of 1 to 10000 (RBs). As an example, in a case where a bandwidth of 1 RB is 180

KHz, and the available maximum bandwidth is 180 MHz, the value of the available maximum bandwidth in Example 1 becomes 1000.

Example 2 of Available Maximum Bandwidth Notification

In Example 2, the available maximum bandwidth is expressed by an integer value in a unit of 25 RBs. That is, when the integer value is set as N, a relationship of available maximum bandwidth=25×N [RBs] is established. In addition, for example, N is a value in which the available maximum bandwidth is in a range of 25 to 1600 (RBs). That is, for example, a relationship of 1≤N≤64 is established.

Example 3 of Available Maximum Bandwidth Notification

In Example 3, the available maximum bandwidth is expressed by a power of 2 (integer value) with 25 RBs set as a reference. That is, when the integer value is set as N, a relationship of the available maximum bandwidth=25×2^N [RBs] is established. In addition, for example, a range of N is 0≤N≤63.

Example of Specification

FIGS. 4 to 6 are examples of specification (excerpts) of 3GPP corresponding to Example 1. FIGS. 4 to 6 are based on Non-Patent Document 2 (3GPP TS 36.331), and a portion changed from Non-Patent Document 2 is expressed by an underline. This is also true of FIGS. 7 to 12.

FIG. 4 illustrates a MIB for notification of the available maximum bandwidth of the DL. "dl-Bandwidth" in the MIB represents the available maximum bandwidth of the DL. "dl-Bandwidth" is an integer value in a unit of 1 RB in a range of 1 to 10000.

FIGS. 5 and 6 illustrate a SIB2 for notification of the available maximum bandwidth of the UL. "ul-Bandwidth" in the SIB2 represents the available maximum bandwidth of the UL. "ul-Bandwidth" is an integer value in a unit of 1 RB in a range of 1 to 10000.

FIGS. 7 to 9 are examples of specification (excerpts) of 3GPP corresponding to Example 2. FIG. 7 illustrates a MIB for notification of the available maximum bandwidth of the DL. "dl-Bandwidth" in the MIB represents the available maximum bandwidth of the DL. "dl-Bandwidth" is an integer value in a unit of 25 RBs in a range of 1 to 64.

FIGS. 8 and 9 illustrate a SIB2 for notification of the available maximum bandwidth of the UL. "ul-Bandwidth" in the SIB2 represents the available maximum bandwidth of the UL. "ul-Bandwidth" is an integer value in a unit of 25 RBs in a range of 1 to 64.

FIGS. 10 to 12 are examples of a specification (excerpts) of 3GPP corresponding to Example 3. FIG. 10 illustrates a MIB for notification of the available maximum bandwidth of the DL. "dl-Bandwidth" in the MIB represents the available maximum bandwidth of the DL. "dl-Bandwidth" is an integer value in a range of 0 to 63. When the integer value is set as N, the available maximum bandwidth is 25×2^N [RBs].

FIGS. 11 and 12 illustrate a SIB2 for notification of the available maximum bandwidth of the UL. "ul-Bandwidth" in the SIB2 represents the available maximum bandwidth of the UL. "ul-Bandwidth" is an integer value in a range of 0 to 63. When the integer value is set as N, the available maximum bandwidth is 25×2^N [RBs].

(Step S2: Capability Reporting of Available Maximum Bandwidth from User equipment 10 to Base STATION 20)

As described above, in step S2, the user equipment 10 reports capability information (UE capability) of the available maximum bandwidth supported by the user equipment 10 to the base station 20.

As a method of expressing the available maximum bandwidth in a case of reporting the available maximum bandwidth supported by the user equipment 10 to the base station 20, any one method of Example 1 (a value in a unit of 1 RB), Example 2 (a value in a unit of 25 RBs), and Example 3 (a value of a power of 2 with 25 RBs set as a reference) may be used, or a method different from Example 1 to Example 3 may be used.

Figure 13:
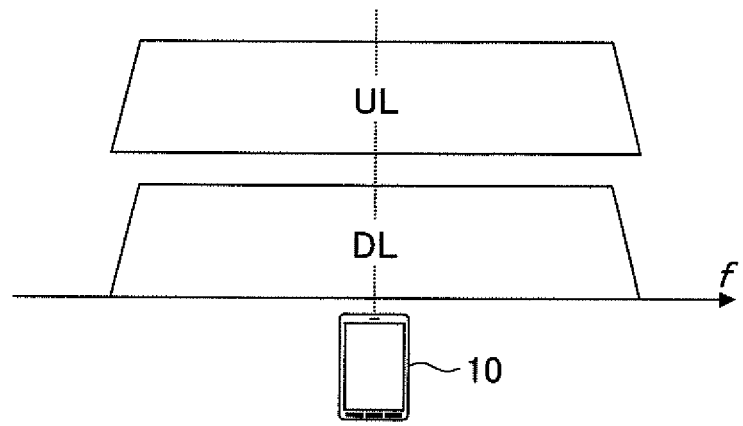
FIG. 13 is a view illustrating Example 1 of UE capability relating to the available maximum bandwidth.
Figure 14:
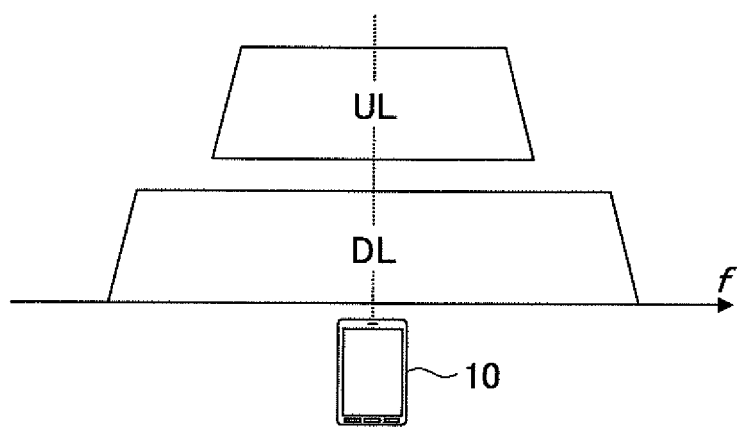
FIG. 14 is a view illustrating Example 2 of UE capability relating to the available maximum bandwidth.
Figure 15:
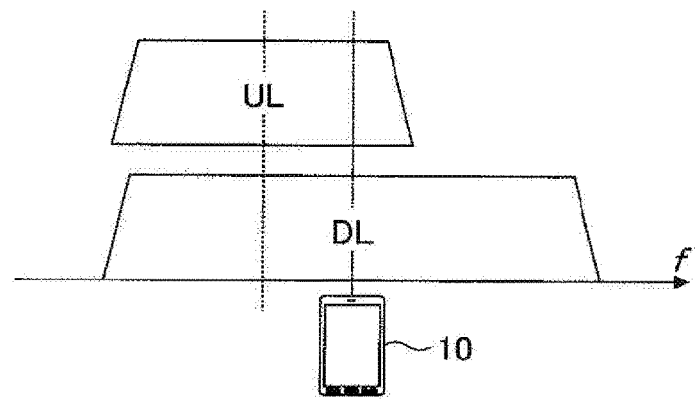
FIG. 15 is a view illustrating Example 3 of UE capability relating to the available maximum bandwidth.

FIGS. 13 to 15 are views illustrating examples of the available maximum bandwidth supported by the user equipment 10. The example illustrated in FIG. 13 corresponds to a case where the available maximum bandwidth of the UL and the DL is the same in each case. In this case, for example, as an available maximum bandwidth that is common to the UL and the DL, the user equipment 10 may report one available maximum bandwidth to the base station 20 as the capability information. In addition, even in this case, the user equipment 10 may report each of the available maximum bandwidth of the UL and the available maximum bandwidth of the DL to the base station 20.

Note that, FIG. 13 illustrates a case where a center frequency is the same in the UL and the DL. However, even in a case where the center frequency is different between the UL and the DL, if the available maximum bandwidth is the same in the UL and the DL, the above-described reporting method of the capability information may be applied.

The example illustrated in FIG. 14 corresponds to a case where the available maximum bandwidths of the UL and the DL are different from each other. In this case, for example, the user equipment 10 reports each of the available maximum bandwidth of the UL and the available maximum bandwidth of the DL to the base station 20. Note that, FIG. 14 illustrates a case where the center frequency is the same in the UL and the DL.

The example illustrated in FIG. 15 corresponds to a case where the available maximum bandwidths of the UL and the DL are different from each other. In this case, for example, the user equipment 10 reports each of the available maximum bandwidth of the UL and the available maximum bandwidth of the DL to the base station 20. FIG. 15 illustrates a case where the center frequency is different between the UL and the DL.

(Step S3: Allocation of Resource to User Equipment 10)

As described above, in step S3, a resource (for example, a time and frequency resource), which is used by the user equipment 10 in a communication, is allocated from the base station 20 to the user equipment 10. More specifically, an UL resource is allocated to perform UL data transmission by the user equipment 10, and a DL resource is allocated to perform DL data transmission by the user equipment 10. Note that, in a case of the TDD, a resource may be allocated to the user equipment 10 without discrimination of the UL and the DL. Hereinafter, with regard to the following operation, basically, the same operation is performed in the UL and the DL, and thus description will be made by using a term of "communication" without discrimination unless otherwise stated. That is, the following operation may be interpreted as an operation related to the UL or an operation related to the DL unless otherwise stated. In a case of the operation related to the UL, the available maximum bandwidth of the base station 20 is a reception bandwidth of the base station 20, and the available maximum bandwidth of the user equipment 10 is a transmission bandwidth of the user equipment 10. In a case of the operation related to the DL, the available maximum bandwidth of the base station 20 is a transmission bandwidth of the base station 20, and the available maximum bandwidth of the user equipment 10 is a reception bandwidth of the user equipment 10.

Figure 16:
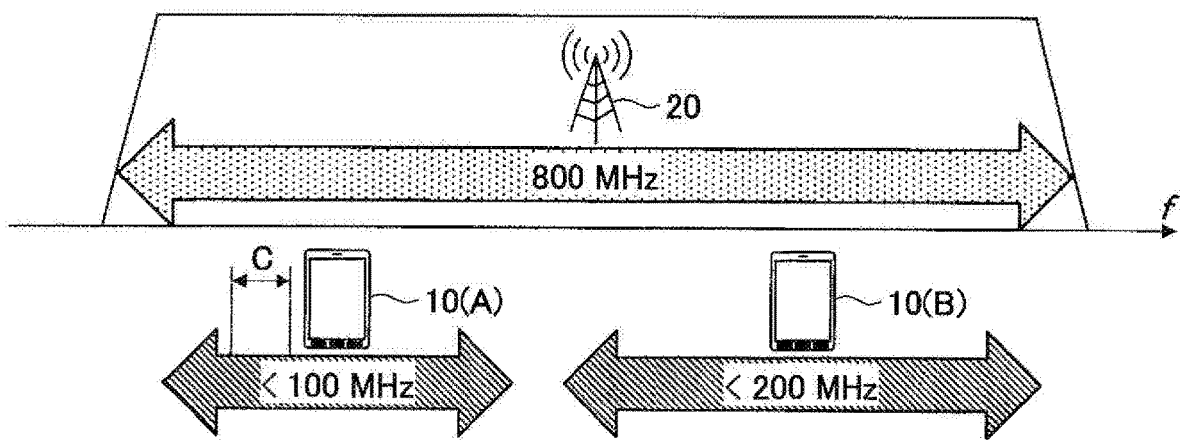
FIG. 16 is a view illustrating Example 1 of resource allocation.

Description will be given of an example of resource allocation in this embodiment with reference to FIG. 16 and FIG. 17. In the example illustrated in FIG. 16, the available maximum bandwidth supported by the base station 20 is 800 MHz, the available maximum bandwidth supported by the user equipment 10(A) is 100 MHz, and the available maximum bandwidth supported by the user equipment 10(B) is 200 MHz. That is, the available maximum bandwidth of the base station 20 is equal to or greater than the available maximum bandwidth of the user equipment 10.

In this case, the base station 20 allocates a partial band (resource) of a band having the available maximum bandwidth (800 MHz) supported by the base station 20 to each user equipment. For example, the base station 20 may allocate a partial band (for example, a band indicated by C in FIG. 16) of the band having the available maximum bandwidth (100 MHz), which is supported by the user equipment 10(A), in the band having the available maximum bandwidth (800 MHz) to the user equipment 10(A).

Figure 17:
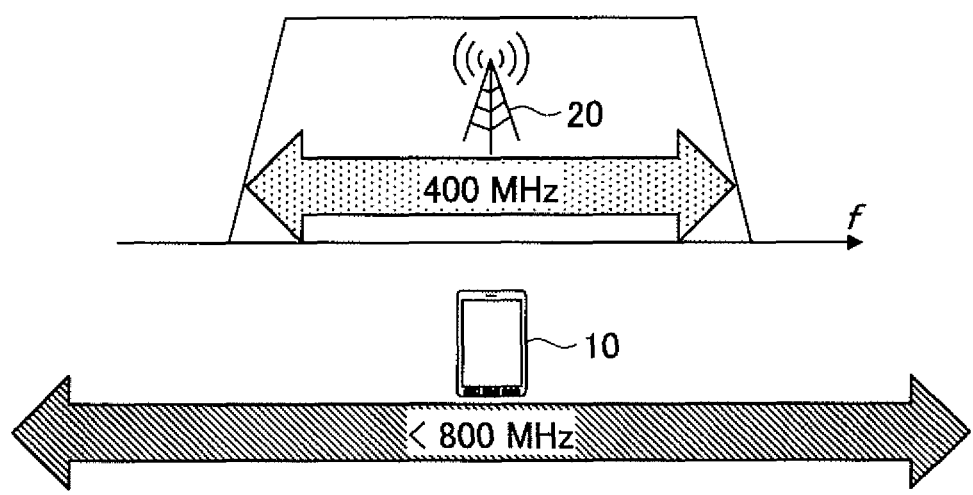
FIG. 17 is a view illustrating Example 2 of resource allocation.

In the example illustrated in FIG. 17, the available maximum bandwidth supported by the base station 20 is 400 MHz, and the available maximum bandwidth supported by the user equipment 10 is 800 MHz. That is, the available maximum bandwidth of the base station 20 is smaller than the available maximum bandwidth of the user equipment 10.

In this case, the base station 20 may allocate a partial band (resource) in the band having the available maximum bandwidth (400 MHz) supported by the base station 20 to the user equipment 10, or may allocate the whole band having the available maximum bandwidth (400 MHz) supported by the base station 20 to the user equipment 10.

<Detailed Example of Resource Allocation Operation>

Hereinafter, description will be given of a detailed example of a resource allocation operation in a case where the available maximum bandwidth of the base station 20 is greater than the available maximum bandwidth of the user equipment 10 (for example, FIG. 16). The following operation is an operation with focus mainly given to a specific user equipment 10. However, the following operation is true of each of a plurality of user equipments under the base station 20 in accordance with capability of the user equipment.

In a case where the available maximum bandwidth of the base station 20 is greater than the available maximum bandwidth of the user equipment 10, the base station 20 divides a band having the available maximum bandwidth of the base station 20 into a plurality of sub-bands on the basis of the available maximum bandwidth (that is grasped by the capability information) of the user equipment 10. In addition, one center frequency is determined in one sub-band. That is, the center frequency is fixed in resources in the same sub-band.

Figure 18:
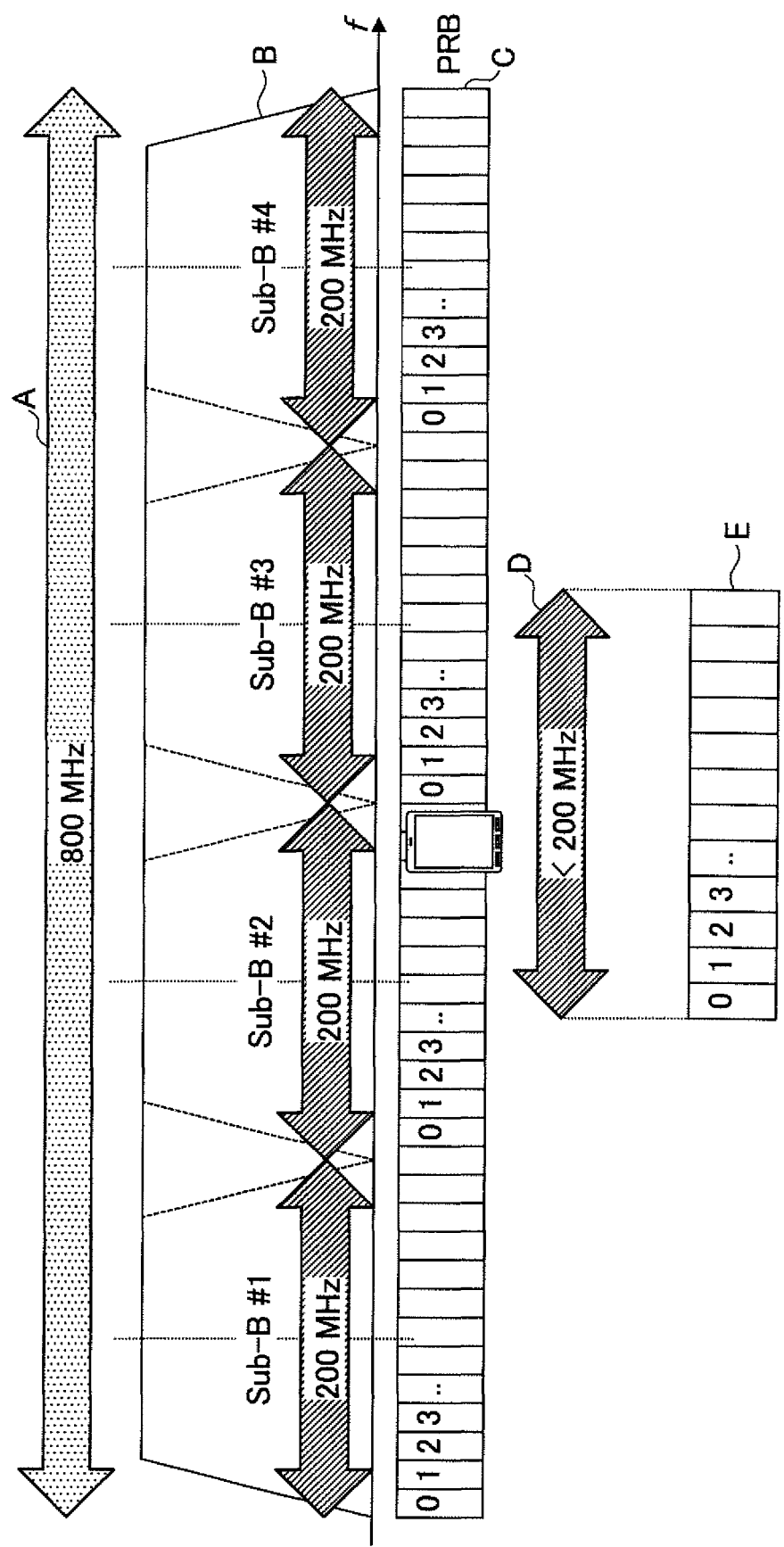
FIG. 18 is a view illustrating a setting example of a center frequency and a sub-band.

FIG. 18 illustrates an example of division into sub-bands. FIG. 18 illustrates an example in which the available maximum bandwidth of the base station 20 is 800 MHz, and the available maximum bandwidth of the user equipment 10 is 200 MHz. As illustrated in FIG. 18, a band having a width of 800 MHz indicated by A is divided into four pieces (800÷200) as indicated by B. In addition, for example, with regard to a user equipment of which the available maximum bandwidth is 400 MHz, a band having a width of 800 MHz indicated by A is divided into two bands having a width of 400 MHz. Note that, "to divide" also includes management (retention) of information of the divided bands (information indicating Sub-B #1 to Sub-B #4 in the example in FIG. 18).

In addition, as indicated by C in FIG. 18, an index of a physical resource block (PRB) is applied to each sub-band. As an example, the PRB index in the sub-band is applied in such a manner that a numerical value (number) of the index increments one by one from a PRB on a low frequency side as illustrated in FIG. 18. For example, 12 (or 16) sub-carriers are set as 1 RB, and an index is applied to the PRB in ascending order from a PRB on a low frequency side toward a PRB on a high frequency side in a sub-band. A rule of applying the index is grasped by the user equipment 10 and the base station 20.

In addition, the base station 20 obtains the center frequency of each of the sub-bands from a band having the available maximum bandwidth supported by the base station 20 and the available maximum bandwidth supported by the user equipment 10. For example, in a case where the center frequency of the band supported by the base station 20 is 28 GHz, the available maximum bandwidth supported by the base station 20 is 800 MHz, and the available maximum bandwidth supported by the user equipment 10 is 200 MHz, the number of sub-bands is four, and the center frequency can be calculated as 27700 MHz, 27900 MHz, 28100 MHz, and 28300 MHz from a low frequency side.

In more generally, in a case where the center frequency of a band supported by the base station 20 is CF, the available maximum bandwidth supported by the base station 20 is BSBW, and the available maximum bandwidth supported by the user equipment 10 is UEBW, the number of sub-bands is "BSBW÷UEBW". Note that, in this example, it is assumed that the BSBW is a numerical value that is divisible by the UEBW without residue. In a case where the BSBW is not divisible by the UEBW, it is preferable to round down the remainder (a number that is less than 1) that is not divisible so as to enter the available maximum bandwidth of the base station 200. However, the remainder (number that is less than 1) that is not divisible may be rounded up.

In addition, as an example, when the number of sub-bands ("BSBW÷UEBW") is set as N, and an index of the sub-bands is set as i (i is applied to the sub-bands in such a manner that i starts from 0 on a low frequency side, increments one by one; 0≤i≤N−1), the center frequency of the sub-bands with the index i is calculated by an expression of "CF−((N/2−i)×UEBW)+UEBW/2".

Next, description will be given of an example of a relationship between a synchronization signal and a sub-band in a case where the center frequency is determined by dividing a band on the basis of the available maximum bandwidth of the base station 20 and the available maximum bandwidth of the user equipment 10 as described above with reference to FIG. 19.

Figure 19:
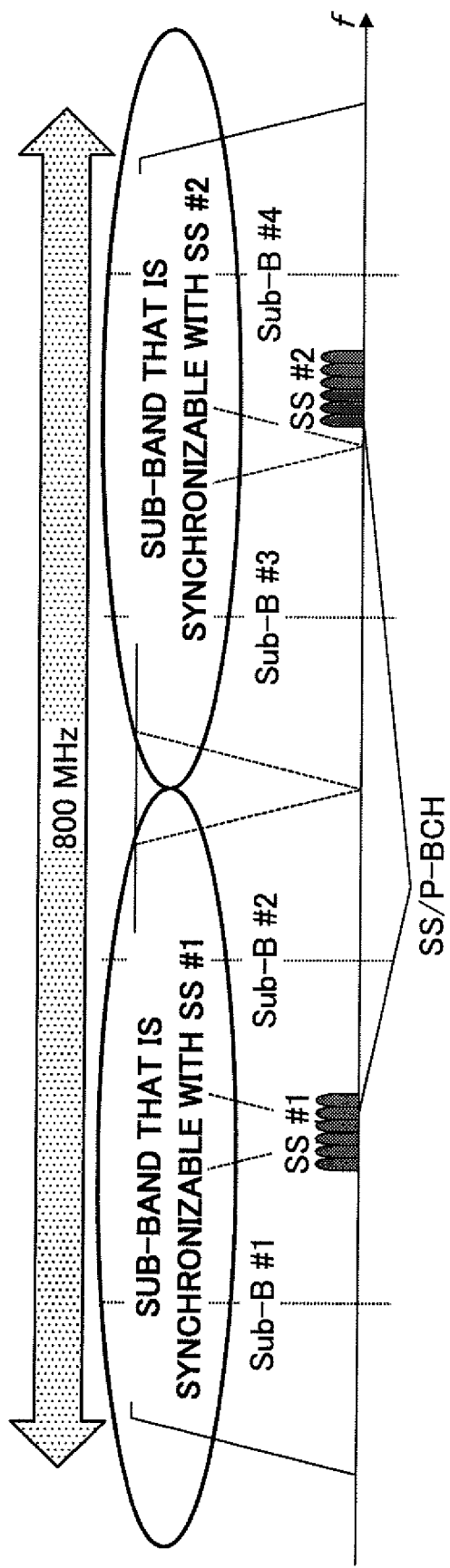
FIG. 19 is a view illustrating an example of a synchronization signal.

FIG. 19 illustrates an example where the base station 20 transmits a synchronization signal with a predetermined bandwidth at two frequency positions in a band having the available maximum bandwidth of the base station 20. In FIG. 19, synchronization signals at the two frequency positions are indicated by SS #1 and SS #2. In addition, the base station 20 may transmits a physical broadcast channel (P-BCH; a channel with which the MIB and the like are transmitted) with a bandwidth same as a predetermined bandwidth at which a synchronization signal is transmitted. In addition, the number of synchronization signals may be 1 or 3 or greater.

For example, the user equipment 10 knows the predetermined bandwidth (for example, 6 RBs), by which the synchronization signal is transmitted, in advance, and searches a signal with the bandwidth in a frequency direction to detect the SS #1 or SS #2 that is transmitted by the base station 20. According to this, the user equipment 10 can be synchronized with the base station 20 by the SS #1 or SS #2. Here, the synchronization is synchronization of timing in a time direction, and a boundary of a radio frame, a sub-frame, a slot, and the like is regarded as timing that is acquired with the synchronization signal. That is, the synchronization signal becomes a timing reference.

In addition, the user equipment 10 detects the SS #1 (or SS #2) to be synchronous with the base station 20, and then the user equipment 10 notifies the base station 20 of capability information of the available maximum bandwidth. The base station 20 can identify the synchronization of the user equipment 10 by the SS #1 (or SS #2), for example, by a frequency of a channel that is used for transmitting the capability information. However, the above description is illustrative only, and the base station 20 can grasp the synchronization of the user equipment 10 with the SS #1 (or SS #2) by using another method.

As illustrated in FIG. 19, the base station 20 divides a bandwidth (800 MHz) into four sub-bands on the basis of the capability information of the user equipment 10.

In this embodiment, a synchronization signal and a sub-band that is synchronizable with the synchronization signal are associated with each other. In the example illustrated in FIG. 19, as an example, the SS #1 is associated with a sub-band #1 and a sub-band #2, and the SS #2 is associated with a sub-band #3 and a sub-band #4.

The base station 20 manages (retains) a correspondence relationship between a synchronization signal and a sub-band that is synchronizable with the synchronization signal. The base station 20 notifies the user equipment 10 of a sub-band that is synchronizable with the synchronization signal by using the synchronization signal, a P-BCH that is transmitted in the same band as in the synchronization signal, or a channel other than these channels. In addition, the base station 20 may notify the user equipment 10 of a center frequency of a synchronization signal other than the synchronization signal, and a sub-band that is synchronizable with the synchronization signal.

For example, in the example of FIG. 19, in a case where the user equipment 10 is synchronized with the SS #1, the user equipment 10 receives the sub-bands #1 and #2 which are synchronizable with the SS #1, and/or a center frequency of the SS #2 and the sub-bands #3 and #4 which are synchronizable with the SS #2 from the base station 20 by the SS #1 or the P-BCH.

In addition, for example, in a case where the user equipment 10 is synchronized with the SS #2, the user equipment 10 receives the sub-bands #3 and #4 which are synchronizable with the SS #2, and/or a center frequency of the SS #1 and the sub-bands #1 and #2 which are synchronizable with the SS #1 from the base station 20 by the SS #2 or the P-BCH.

As a notification content of sub-bands (the sub-bands #1 and #2, or the sub-bands #3 and #4) from the base station 20 to the user equipment 10, for example, any one of a center frequency of each sub-band, frequencies on both ends of the sub-band, a frequency position on both ends of a band (for example, a band of the sub-band #1+the sub-band #2 for the SS1 #1) that is covered with a synchronization signal may be used. In addition, a method other than the above-described methods may be used.

In addition, for example, in a case where the user equipment 10 is synchronized with the SS #1, and the user equipment 10 receives allocation of a resource in the sub-band #1 from the base station 20, the user equipment 10 grasps that a frequency position of the resource is in a range that is covered with the SS #1, and can perform a data communication by using the resource while using the synchronization with the SS #1. In addition, in a case where the user equipment 10 is synchronized with the SS #1, and receives allocation of a resource in the sub-band #4 from the base station 20, the user equipment 10 detects the SS #2 with a center frequency of the SS #2, and can perform a data communication using the resource in the sub-band #4 by using the synchronization with the SS #2.

Description will be given of another example of a relationship between a synchronization signal and a sub-band in a case where the center frequency is determined by dividing a band on the basis of the available maximum bandwidth of the base station 20 and the available maximum bandwidth of the user equipment 10 with reference to FIG. 20.

Figure 20:
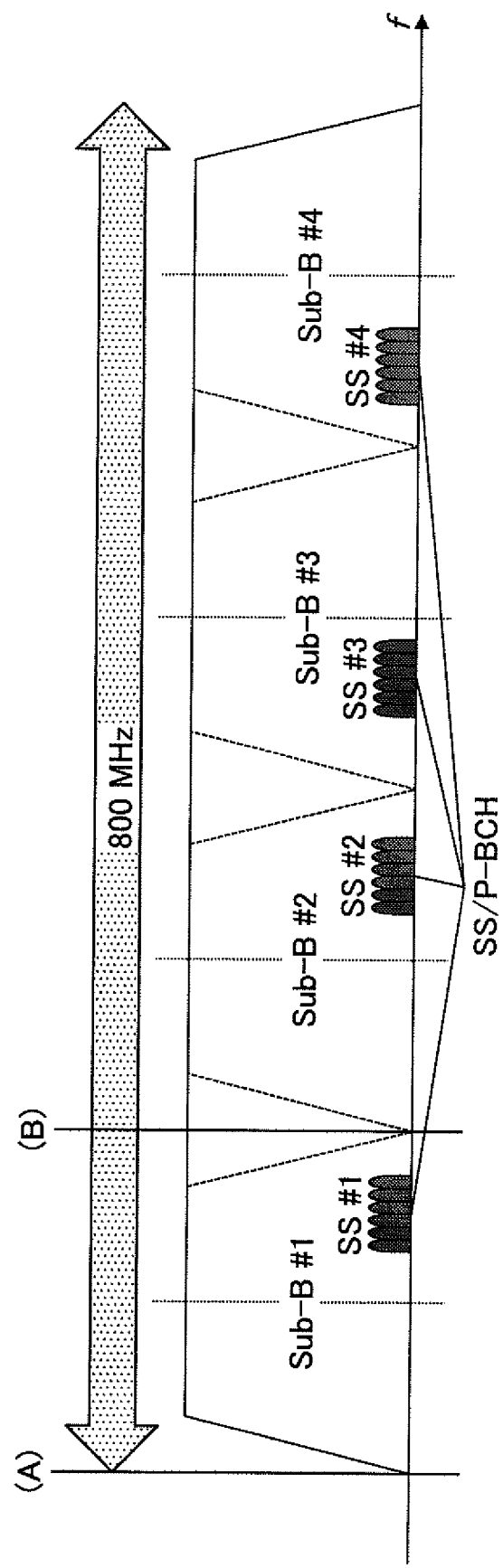
FIG. 20 is a view illustrating an example of the synchronization signal.

FIG. 20 illustrates an example in which four synchronization signals (SS #1 to SS #4) are transmitted from the base station 20. Note that, it is an example that the number of the synchronization signals is 4, and the number may be greater or less than 4. In the example illustrated in FIG. 20, each band of the four synchronization signals is set within a band of any one sub-band. Specifically, a band of the SS #1 is set in a band of the sub-band #1, a band of the SS #2 is set in a band of the sub-band #2, a band of the SS #3 is set in a band of the sub-band #3, and a band of the SS #4 is set in a band of the sub-band #4. In addition, as is the case with FIG. 19, the base station 20 transmits the P-BCH in a band in which a synchronization signal is transmitted. An operation example of a case illustrated FIG. 20 is as follows.

For example, the user equipment 10 detects the SS #1 through cell search, and is synchronized with the base station 20. In addition, the user equipment 10 notifies the base station 20 of capability information of the available maximum bandwidth of the user equipment 10. The base station 20 can identify the synchronization of the user equipment 10 by the SS #1, for example, by a frequency of a channel that is used for notification of the capability information. However, the above description is illustrative only, and the base station 20 can grasp the synchronization of the user equipment 10 by the SS #1 by using another method.

As illustrated in FIG. 20, the base station 20 divides a bandwidth (800 MHz) into four sub-bands on the basis of the capability information of the user equipment 10. In addition, the base station 20 determines to configure the sub-band #1 including the SS #1 to the user equipment 10. Note that, in a case where the sub-band #1 is set to the user equipment 10, resource allocation for a communication to the user equipment 10 is performed by a resource in the sub-band #1.

In this example, the base station 20 notifies the user equipment 10 of positions ((A) and (B) in FIG. 20) on both ends of the sub-band #1 on a frequency axis so as to configure the sub-band #1 including the SS #1 to the user equipment 10. For example, the notification may be performed with the P-BCH or other channels.

More specifically, the base station 20 notifies the user equipment 10 of an absolute value of frequencies on both ends, or a frequency number of the both ends as information indicating positions of the both ends of the sub-band #1 on the frequency axis. For example, the frequency number is E-UTRA absolute radio frequency channel number (EARFCN) (Non-Patent Document 3), and a physical frequency can be calculated from the number.

The user equipment 10, which receives the positions of the both ends of the sub-band #1 on the frequency axis, can grasp a center frequency of the sub-band #1. In addition, when receiving a notification of a PRB index from the base station 20 as resource allocation information, the user equipment 10 can grasp that the PRB index indicates a PRB in the sub-band #1.

As configuration of the sub-band #1 to the user equipment 10, it is merely an example to notify the user equipment 10 of the positions on both ends using the absolute value of the frequencies or the frequency number. As another method, the base station 20 may notify the user equipment 10 of an offset (a difference on the frequency axis) from the center frequency of the SS #1 with respect to the positions on both ends. Note that, the user equipment 10 is synchronized by the SS #1, and thus the user equipment 10 grasps the center frequency of the SS #1.

For example, when the center frequency of the SS #1 is set as SCF, the frequency indicated by (A) in FIG. 20 is set as AF, and the frequency indicated by (B) is set as BF, the base station 20 notifies the user equipment 10 of (AF−SCF) and (BF−SCF) as the offset. According to this, the user equipment 10, which grasps the SCF, can grasp the AF and the BF, and can grasp the center frequency of the sub-band #1 as "(AF+BF)/2".

Note that, the above-described example is illustrative only. For example, in a case where the user equipment 10 is synchronized with the SS #2, the user equipment 10 receives information indicating positions of both ends of the sub-band #2 from the base station 20. This is true of the SS #3 and the SS #4.

As indicated by B in FIG. 18, in addition to the method of determining the center frequency by dividing a band, the base station 20 may determine an arbitrary frequency in a band having the available maximum bandwidth supported by the base station 20 as a center frequency for the user equipment 10, and the base station 20 may determine an available maximum bandwidth, which has the center frequency, of the user equipment 10 in a range of capability of the available maximum bandwidth supported by the user equipment 10, and the base station 20 may notify the user equipment 10 of the center frequency and the available maximum bandwidth which are determined. Note that, the base station 20 may notify the user equipment 10 of information (an absolute value of a frequency, a frequency number, and the like) indicating positions on both ends of a band corresponding to the center frequency and the available maximum bandwidth which are determined. An example of the available maximum bandwidth is indicated by D in FIG. 18. The available maximum bandwidth that is determined may be referred to as a sub-band. In addition, the example indicated by D in FIG. 18 represents an example in which the center frequency of the band having the available maximum bandwidth supported by the base station 20 is determined as a center frequency for the user equipment 10. In addition, in the example of the case, an index of the PRB is applied as indicated by E in FIG. 18.

Next, description will be given of an example of a relationship between a synchronization signal and a sub-band in a case where the base station 20 determines an arbitrary center frequency and the available maximum bandwidth (sub-band), and notifies the user equipment 10 of the center frequency and the available maximum bandwidth. In this case, the base station 20 notifies the user equipment 10 of a center frequency of a synchronization signal that becomes a timing reference in a case of performing a communication in a range of a band having an available maximum bandwidth including the center frequency that is determined. Notification of the center frequency of the synchronization signal may be performed simultaneously with notification of a sub-band, or independently from the notification of the sub-band. In addition, as a channel for notification, the P-BCH or other channels may be used.

For example, in a case where a center frequency of a synchronization signal that is currently used is the same as the notified center frequency of the synchronization signal, the user equipment 10, which receives a notification of the center frequency of the synchronization signal, retains synchronization with the synchronization signal. In a case where the center frequency of the synchronization signal that is currently used is different from the notified center frequency of the synchronization signal, the user equipment 10 switches the synchronization into synchronization with the synchronization signal having the notified center frequency.

A specific example will be described with reference to FIG. 21. As is the case with FIG. 19, also in the example of FIG. 21, the base station 20 transmits SS #1, SS #2, and a P-BCH corresponding to the SS #1 and the SS #2 in a predetermined bandwidth. In addition, a range of a sub-band, which is synchronizable with each synchronization signal, is set to be the same between FIG. 21 and FIG. 19.

Figure 21:
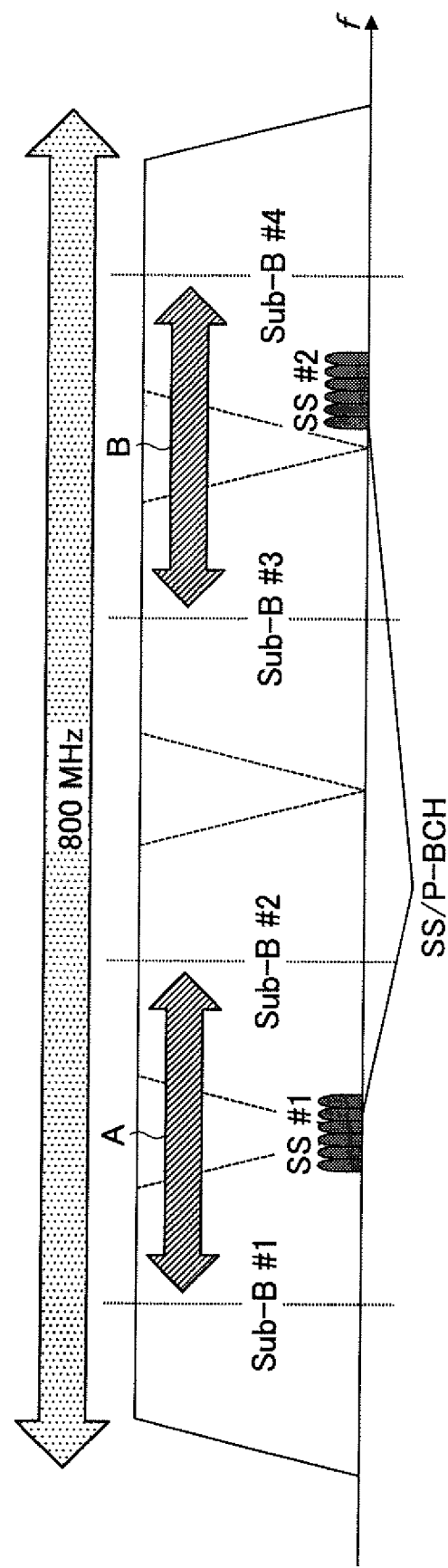
FIG. 21 is a view illustrating an example of the synchronization signal.

For example, in a case where the base station 20, which receives capability information from the user equipment 10, determines a band corresponding to "sub-band #1+sub-band #2" in FIG. 21 as a band (sub-band) for the user equipment 10, the base station 20 sets the SS #1 to the user equipment 10 as a timing reference, and notifies the user equipment 10 of a center frequency of the SS #1. The notification of the center frequency of the SS #1 may be performed simultaneously with or independently from the notification of "sub-band #1+sub-band #2". In addition, even in a case where the base station 20 determines a band indicated by A in FIG. 21 as the band (sub-band) for the user equipment 10, the base station 20 sets the SS #1 to the user equipment 10 as the timing reference, and notifies the user equipment 10 of the center frequency of the SS #1.

In addition, for example, in a case where the base station 20 determines a band corresponding to "sub-band #3+sub-band #4" in FIG. 21 as the band (sub-band) for the user equipment 10, the base station 20 sets the SS #2 to the user equipment 10 as the timing reference, and notifies the user equipment 10 of a center frequency of the SS #2. The notification of the center frequency of the SS #2 may be performed simultaneously with or independently from the notification of "sub-band #3+sub-band #4". In addition, even in a case where the base station 20 determines a band indicated by B in FIG. 21 as the band (sub-band) for the user equipment 10, the base station 20 sets the SS #2 to the user equipment 10 as the timing reference, and notifies the user equipment 10 of the center frequency of the SS #2.

As described above, even in a case where the base station 20 sets an arbitrary band (sub-band) to the user equipment on the basis of the capability information of the user equipment 10, the method described with reference to FIG. 20 is also applicable to the case. For example, as illustrated in FIG. 20, in a case where four synchronization signals are transmitted, the user equipment 10 detects the SS #1 through cell search, and is synchronized with the base station 20. In addition, the user equipment 10 notifies the base station 20 of capability information of the available maximum bandwidth of the user equipment 10.

The base station 20 determines, for example, to configure a band, which corresponds to "sub-band #1+sub-band #2" including the SS #1 in FIG. 20, to the user equipment 10 on the basis of the capability information of the user equipment 10. In addition, the base station 20 notifies the user equipment 10 of positions of both ends of the "sub-band #1+sub-band #2" on the frequency axis so as to configure the "sub-band #1+sub-band #2" including the SS #1 to the user equipment 10. For example, the notification may be performed with the P-BCH or other channels. In addition, a notification content may be an absolute value of a frequency, a frequency number, or an offset as described above.

In a case of B of FIG. 18 (in a case of determining a center frequency by diving a band), designation (allocation) of a resource to the user equipment 10 from the base station 20 can be performed through notification of a center frequency (or frequencies on both ends) of a sub-band and a PRB index in the sub-band from the base station 20 to the user equipment 10. For example, the notification can be performed by using a PDCCH. The user equipment 10, which receives the center frequency (or the frequencies on both ends) of the sub-band and the PRB index in the sub-band, can grasp an RB, which is indicated by the PRB index, from the center frequency (or the frequencies on both ends) and the available maximum bandwidth of the user equipment 10, and can perform a data communication (transmission or reception) by using the RB. In addition, the base station 20 may notify the user equipment 10 of the center frequency (or the frequencies on both ends) of the sub-band by using an RRC message, an MAC control element, or other signals. Then, in a stage in which the user equipment 10 performs the data communication, the base station 20 may notify the user equipment 10 of a PRB index for resource designation with the PDCCH.

In a case of D in FIG. 18 (in a case of determining an arbitrary band (sub-band)), resource designation (allocation) from the base station 20 to the user equipment 10 can be performed by notification of an available maximum bandwidth of the sub-band, the center frequency (or frequencies on both ends) of the sub-band, and a PRB index in the sub-band from the base station 20 to the user equipment 10. For example, the notification can be performed by using the PDCCH. The user equipment 10, which receives the notification, can grasp an RB, which is indicated by the PRB index, from the center frequency (or the frequencies on both ends) and the available maximum bandwidth, and can perform a data communication (transmission or reception) by using the RB. In addition, the base station 20 may notify the user equipment 10 of the available maximum bandwidth of the sub-band and the center frequency (or the frequencies on both ends) of the sub-band by using an RRC message or an MAC control element. Then, in a stage in which the user equipment 10 performs the data communication, the base station 20 may notify the user equipment 10 of a PRB index for resource designation with the PDCCH. When the base station 20 notifies the user equipment 10 of the available maximum bandwidth of the sub-band, and the center frequency (or the frequencies on both ends) of the sub-band by using the RRC message or the MAC control element, notification of the available maximum bandwidth of the sub-band and notification of the center frequency (or the frequencies on both ends) of the sub-band may be simultaneously performed, or may be performed at notification times different from each other.

Furthermore, in a case where the base station 20 notifies the user equipment 10 of the frequencies on both ends of the sub-band, the available maximum bandwidth may not be notified. The reason for this is because the available maximum bandwidth can be calculated from the frequencies on both ends.

In either a case of designating the center frequency (or the frequencies on both ends) with the PDCCH, or a case of designating the center frequency (or the frequencies on both ends) with the RRC message or the MAC control element, in a case where the center frequency that is used in the user equipment 10 is changed, the user equipment 10 performs retuning to the center frequency after changing.

Each of the center frequency and the frequencies on both ends, which are notified from the base station 20 to the user equipment 10, may be an absolute value of a frequency, a frequency number, or other pieces of information which indicate the frequency.

<With Respect to DL and UL>

As described above, the processing contents with respect to the center frequency, the available maximum bandwidth, and the like in the column of <Detailed Example of Resource Allocation Operation> (hereinafter, referred to as "detailed example") may be applied for DL and may be applied for UL. In addition, the processing contents which are described in the "detailed example" may be applied to both of DL and UL, or may be applied to only DL or only UL.

In a case where the radio communication system of this embodiment is operated in TDD, designation of the center frequency (or the frequencies on both ends) from the base station 20 to the user equipment 10 may be applied to only the DL, and a center frequency (or frequencies on both ends) of the DL may be used for the center frequency (the frequencies on both ends) of the UL. In addition, in a case where the radio communication system of this embodiment is operated in the TDD, designation of the center frequency (or the frequencies on both ends) from the base station 20 to the user equipment 10 may be applied to only the UL, and the center frequency (or the frequencies on both ends) of the UL may be used with respect to the center frequency (the frequencies on both ends) of the DL.

In addition, for example, in a case where the radio communication system of this embodiment is operated in FDD, a center frequency interval Δ (for example, the center frequency in the DL—the center frequency in the UL) between the DL and the UL may be determined in advance. In this case, when receiving the designation of the center frequency (referred to as "DLCF") of the DL from the base station 20, the user equipment 10 may determine "DLCF−Δ" as the center frequency of the UL without designation of the center frequency of the UL. In addition, when receiving the designation of the center frequency (referred to as "ULCF") of the UL from the base station 20, the user equipment 10 may determine "ULCF+Δ" as the center frequency of the DL without designation of the center frequency of the DL.

In the above-described case, with regard to the center frequency, which is not designated, of the UL or the DL, the base station 20 grasps the center frequency of the UL or the DL in the same manner as in the user equipment 10. In designation of a resource with respect to the user equipment 10 in a sub-band to which the center frequency, which is not designated, of the UL or the DL pertains, the base station 20 may give a notification of the PRB index of the UL or the DL without designation of the center frequency.

In any one of the above-described cases, with regard to the available maximum bandwidth, the user equipment 10 may use an available maximum bandwidth thereof. In addition, in a case where a UL available maximum bandwidth is designated from the base station 20, the user equipment 10 may use the bandwidth as a DL available maximum bandwidth. In addition, in a case where the DL available maximum bandwidth is designated from the base station 20, the user equipment 10 may use the bandwidth as the UL available maximum bandwidth.

As described above, according to this embodiment, the user equipment 10 can flexibly use a band (for example, 800 MHz in FIG. 18) having a bandwidth that is provided in the radio communication system without performing the CA in accordance with the capability of the user equipment 10 (for example, B and D in FIG. 18, and the like).

(Device Configuration)

Description will be given of a functional configuration example of the user equipment 10 and the base station 20 which execute the operation of this embodiment as described above.

<User Equipment 10>

Figure 22:
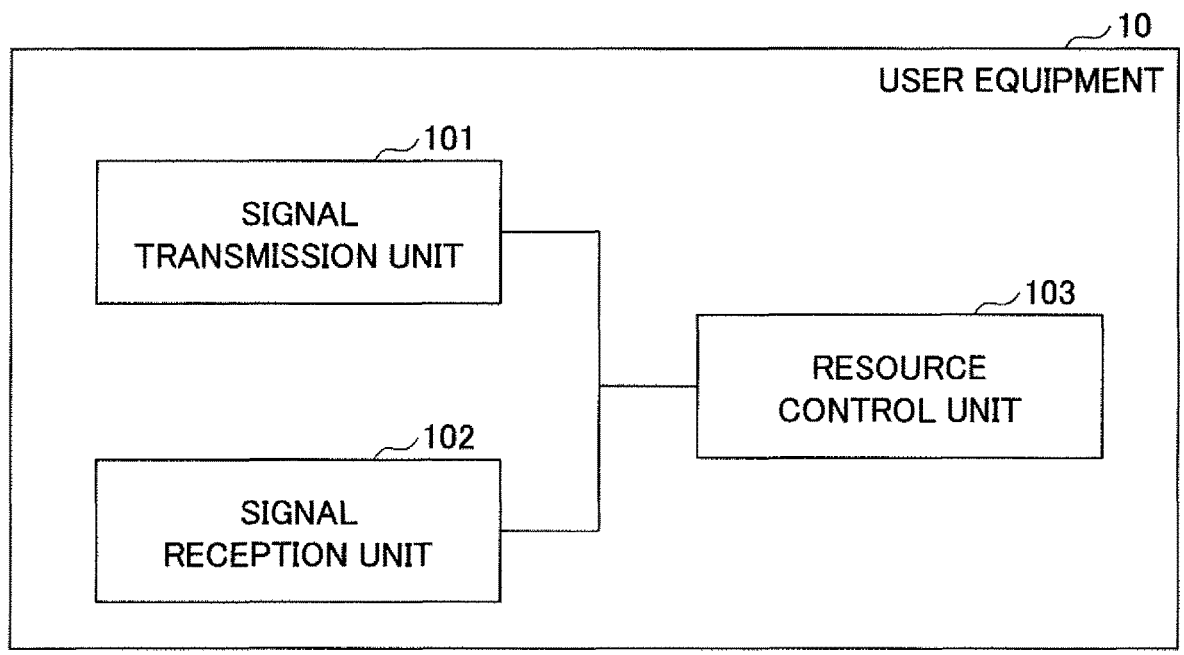
FIG. 22 is a view illustrating an example of a functional configuration of a user equipment 10.

FIG. 22 is a view illustrating an example of a functional configuration of the user equipment 10. As illustrated in FIG. 22, the user equipment 10 includes a signal transmission unit 101, a signal reception unit 102, and a resource control unit 103. The functional configuration illustrated in FIG. 22 is illustrative only. A functional classification or the name of the functional units may be arbitrarily set as long as the operation according to this embodiment can be executed. For example, the resource control unit 103 may be divided into a reception side and a transmission side, the resource control unit 103 on the transmission side may be included in the signal transmission unit 101, and the resource control unit 103 on the reception side may be included in the signal reception unit 102.

The signal transmission unit 101 is configured to convert data, which is to be transmitted from the user equipment 100, to a signal that is wirelessly transmitted, and to wirelessly transmit the signal. The signal reception unit 102 is configured to wirelessly receive various signals and to acquire data from the signal which are received. In addition, the signal transmission unit 101 and the signal reception unit 102 include the synchronous operation function and the function of performing the retuning of the center frequency as described above with reference to FIG. 19 to FIG. 21, and the like.

The resource control unit 103 creates capability information of the available maximum bandwidth of the user equipment 10, and transports the capability information to the signal transmission unit 101. In addition, the capability information is transmitted by the signal transmission unit 101. In addition, the resource control unit 103 specifies a resource block that is used in a communication on the basis of the center frequency (the frequencies on both ends), the resource block index, and the like, which are received from the base station 20 through the signal reception unit 102, and instructs the signal transmission unit 101 or the signal reception unit 102 to perform a communication by using the resource block. In addition, the resource control unit 103 may determine whether or not to be resident in a cell of the base station 20 on the basis of the available maximum bandwidth, which is received from the base station 20 through the signal reception unit 102, of the base station 20. In addition, the resource control unit 103 may retain an interval of a center frequency between the DL and the UL, and when receiving a center frequency of any one of the DL and the UL, the resource control unit 103 may determine a center frequency on the other side on the basis of the interval.

In addition, the signal transmission unit 101 may be configured to transmit a first maximum bandwidth (available maximum bandwidth), which is a maximum bandwidth that is available to the user equipment 10 in a communication, to the base station 20, and the signal reception unit 102 may be configured to receive, from the base station 20, a center frequency or frequencies on both ends of a band having a bandwidth, which is equal to or less than the first maximum bandwidth, in a band having a second maximum bandwidth that is a maximum bandwidth available to the base station 20 in a communication. That is, a center frequency or frequencies on both ends in a band having the second maximum bandwidth are received from the base station 20.

In addition, the signal reception unit 102 may be configured to receive information, which designates a resource in a band having a bandwidth equal to or less than the first maximum bandwidth, from the base station 20 in combination with the center frequency or the frequencies on both ends or separately from the center frequency or the frequencies on both ends, and the signal transmission unit 101 and/or the signal reception unit 102 may be configured to perform a data communication by using the resource.

<Base Station 200>

Figure 23:
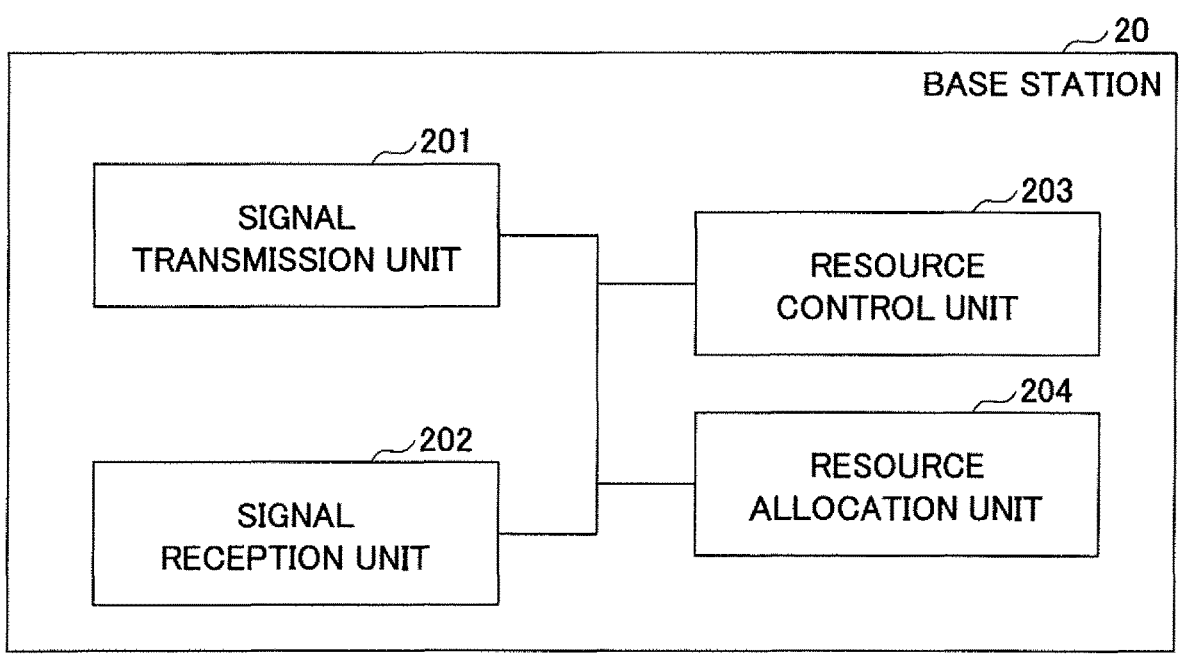
FIG. 23 is a view illustrating an example of a functional configuration of the base station 20.

FIG. 23 is a view illustrating an example of a functional configuration of the base station 20. As illustrated in FIG. 23, the base station 20 includes a signal transmission unit 201, a signal reception unit 202, a resource control unit 203, and a resource allocation unit 204. The functional configuration illustrated in FIG. 23 is illustrative only. A functional classification or the name of the functional units may be arbitrarily set as long as the operation according to this embodiment can be executed.

The signal transmission unit 201 is configured to convert data, which is to be transmitted from the base station 20, into a signal that is to be wirelessly transmitted, and to wirelessly transmit the signal. The signal reception unit 202 is configured to wirelessly receive various signals, and to acquire data from a signal that is received. In addition, the signal transmission unit 201 and the signal reception unit 202 is capable of performing a communication between a plurality of user equipments while switching a center frequency with respect to the user equipments. In addition, the signal transmission unit 201 includes the synchronous operation function described with reference to FIG. 19 to FIG. 21, and the like.

The resource control unit 203 is configured to divide a band having the available maximum bandwidth of the base station 20, and to determine a center frequency in a band having the available maximum bandwidth of the user equipment 10 on the basis of the band having the available maximum bandwidth and the available maximum bandwidth of the user equipment 10.

In addition, the signal reception unit 201 is configured to receive the available maximum bandwidth of the user equipment 10 from the user equipment 10 as capability information, and the signal transmission unit 202 is configured to transmit the center frequency or the frequencies on both ends, which are determined by the resource control unit 203, of the band to the user equipment 10.

The resource allocation unit 204 is configured to determine a resource that is used in a communication in the user equipment 10 and to transport a resource block index and the like which indicate the resource to the signal transmission unit 201. The signal transmission unit 201 transmits the index and the like to the user equipment 10

<Hardware Configuration>

The block diagrams (FIG. 22 and FIG. 23) which are used in description of the embodiment illustrate blocks of a function unit. The function blocks (constituent units) are realized by an arbitrary combination of hardware and/or software. In addition, means for realizing respective function blocks is not particularly limited. That is, the respective function blocks may be realized by one device in which a plurality of elements are physically and/or logically combined. In addition, two or greater devices, which are physically and/or logically separated from each other, may be directly and/or indirectly (for example, wire and/or wirelessly) connected, and the respective function blocks may be realized by a plurality of the devices.

Figure 24:
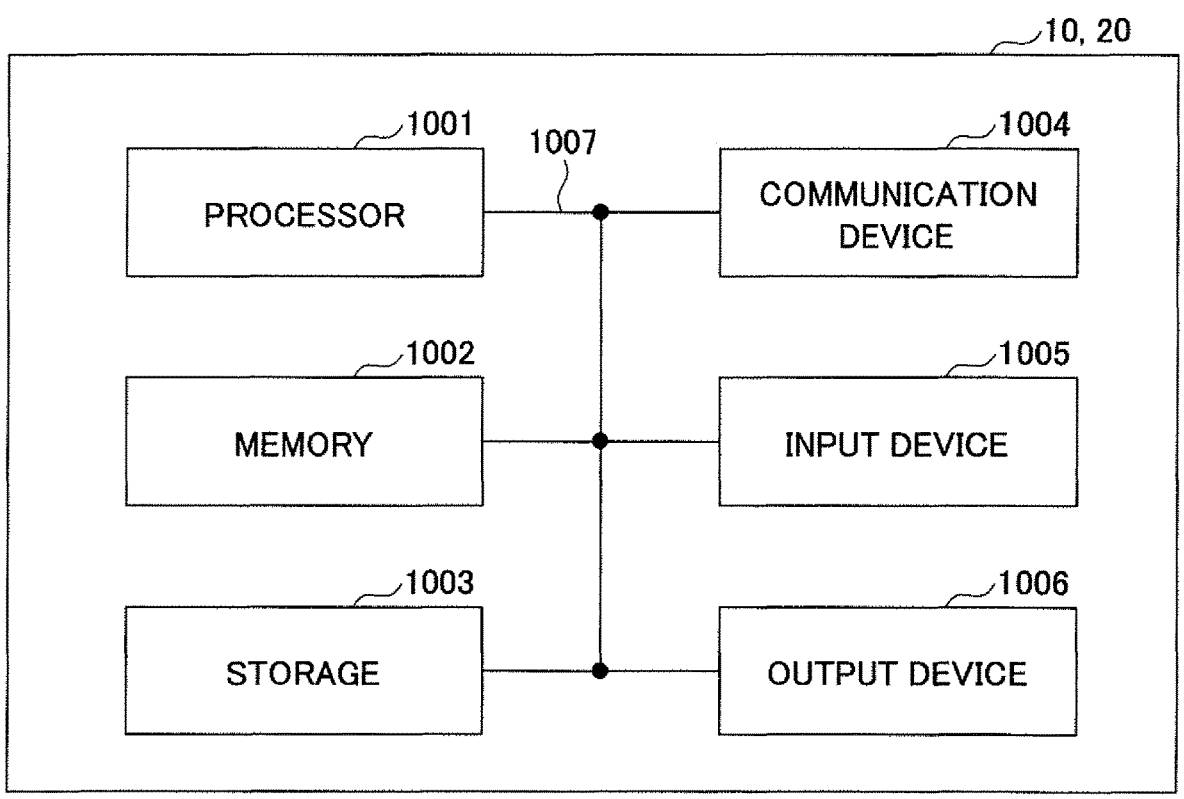
FIG. 24 is a view illustrating an example of a hardware configuration of the use equipment 10 and the base station 20.

In addition, for example, the user equipment 10 and the base station 20 of this embodiment may function as a computer that performs processing according to this embodiment. FIG. 24 is a view illustrating an example of a hardware configuration of the user equipment 10 and the base station 20 according to this embodiment. The user equipment 10 and the base station 20 may be configured as a computer device that physically includes a processor 1001, a memory 1002, a storage 1003, a communication device 1004, an input device 1005, an output device 1006, a bus 1007, and the like.

Furthermore, in the following description, a term "device" may be substituted with a circuit, a unit, and the like. The hardware configuration of the user equipment 10 and the base station 20 may include the respective devices, which are indicated by reference numerals 1001 to 1006 in the drawing, one by one or in a plural number, or may not include a part of the devices.

Respective functions in the user equipment 10 and the base station 20 are realized by causing hardware such as the processor 1001 and the memory 1002 to read predetermined software (program) so as to allow the processor 1001 to perform an arithmetic operation, and by controlling a communication by the communication device 1004, and reading-out and/or input of data in the memory 1002 and the storage 1003.

For example, the processor 1001 allows an operating system to operate so as to control the entirety of the computer. The processor 1001 may be constituted by a central processing unit (CPU) that includes an interface with a peripheral device, a control device, an arithmetic operation device, a register, and the like.

In addition, the processor 1001 reads out a program (program code), a software module, or data from the storage 1003 and/or the communication device 1004 into the memory 1002, and performs various kinds of processing according to the program, the software module, or the data. As the program, a program, which allows the computer to execute at least a part of the operations described in the embodiment, is used. For example, the signal transmission unit 101, the signal reception unit 102, and the resource control unit 103 of the user equipment 10 may be realized by a control program that is stored in the memory 1002 and is operated by the processor 1001. In addition, the signal transmission unit 201, the signal reception unit 202, the resource control unit 203, and the resource allocation unit 204 of the base station 20 may be realized by a control program that is stored in the memory 1002 and is operated by the processor 1001. The above-described various kinds of processing are described to be executed by one processor 1001, but may be simultaneously or sequentially executed by two or greater processors 1001. The processor 1001 may be mounted by one or greater chips. Furthermore, the program may be transmitted from a network through electric communication line.

The memory 1002 is a computer-readable recording medium, and may be constituted by, for example, at least one of a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), and the like. The memory 1002 can retain a program (program code), a software module, and the like which can be executed to carry out processing according to the embodiment of the invention.

The storage 1003 is a computer-readable recording medium, and may be constituted by at least one, for example, among an optical disc such as a compact disc ROM (CD-ROM), a hard disk drive, a flexible disk, a magneto-optical disc (for example, a compact disc, a digital multi-purpose disc, and a Blue-ray (registered trademark) disc), a smart card, a flash memory (for example, a card, a stick, a key drive), a floppy (registered trademark) disk, a magnetic strip, and the like. The storage 1003 may be referred to as an auxiliary storage device. For example, the above-described storage medium may be a database including the memory 1002 and/or the storage 1003, a server, and other appropriate media.

The communication device 1004 is hardware (transmission and reception device) that performs a communication between computers through a wire and/or a radio network, and may be referred to as, for example, a network device, a network controller, a network card, a communication module, and the like. For example, the signal transmission unit 101 and the signal reception unit 102 of the user equipment 10 may be realized by the communication device 1004. In addition, the signal transmission unit 201 and the signal reception unit 202 of the base station 20 may be realized by the communication device 1004.

The input device 1005 is an input device (for example, a keyboard, a mouse, a microphone, a switch, a button, a sensor, and the like) that receives an input from the outside. The output device 1006 is an output device (for example, a display, a speaker, an LED lamp, and the like) that performs output to the outside. Furthermore, the input device 1005 and the output device 1006 may have an integral configuration (for example, a touch panel).

In addition, respective devices including the processor 1001, the memory 1002, and the like are connected to each other through a bus 1007 for an information communication. The bus 1007 may be configured as a single bus, or may be configured as a bus that is different between devices.

In addition, the user equipment 100 and the base station 200 may include hardware such as a microprocessor, a digital signal processor (DSP), an application specific integrated circuit (ASIC), a programmable logic device (PLD), and a field programmable gate array (FPGA), or a part or the entirety of respective function blocks may be realized by the hardware. For example, the processor 1001 may be mounted by at least one piece of hardware.

Summary of Embodiment

As described above, according to this embodiment, there is provided a user equipment in a radio communication system including the user equipment and a base station. The user equipment includes: a transmission unit that transmits a first maximum bandwidth, which is a maximum bandwidth available to the user equipment in a communication, to the base station; and a reception unit that receives, from the base station, a center frequency or frequencies on both ends of a band having a bandwidth, which is equal to or less than the first maximum bandwidth, in a band having a second maximum bandwidth that is a maximum bandwidth available to the base station in a communication.

According to this configuration, the user equipment can flexibly use a band having a bandwidth, which is provided in a radio communication system, in accordance with capability of the user equipment.

The reception unit may receive information, which designates a resource in a band having a bandwidth equal to or less than the first maximum bandwidth, from the base station in combination with the center frequency or the frequencies on both ends or separately from the center frequency or the frequencies on both ends, and the transmission unit or the reception unit may perform a data communication by using the resource. According to this configuration, the user equipment can perform a data communication by using a resource in a band (sub-band) to which the center frequency pertains.

The information, which is received from the base station by the reception unit and designates the resource, may be an index that is applied to a resource block in a band having a bandwidth equal to or less than the first maximum bandwidth. According to this configuration, it is possible to give a notification of a resource, for example, in a small information amount.

The reception unit may receive an integer value, which indicates the second maximum bandwidth, from the base station. According to this configuration, the user equipment can grasp the second maximum bandwidth. In addition, an integer value is used, and thus it is possible to express the second maximum bandwidth in a fine granularity.

In addition, according to this embodiment, there is provided a base station in a radio communication system including a user equipment and the base station. The base station includes: a reception unit that receives a first maximum bandwidth, which is a maximum bandwidth available to the user equipment in a communication, from the user equipment; a resource control unit that determines a center frequency and frequencies on both ends of a band having a bandwidth equal to or less than the first maximum bandwidth on the basis of a band having a second maximum bandwidth that is a maximum bandwidth available to the base station in a communication and the first maximum bandwidth that is received by the reception unit; and a transmission unit that transmits the center frequency or the frequencies on both ends, which are determined by the resource control unit, to the user equipment.

According to this configuration, the user equipment can flexibly use a band having a bandwidth, which is provided in a radio communication system, in accordance with capability of the user equipment.

Supplement of Embodiment

Hereinbefore, the embodiment of the invention has been described. However, the invention that is disclosed is not limited to the embodiment, and it should be understood by those skilled in the art that various modification examples, variation examples, alternative examples, substitution examples, and the like can be made. Description has been made by using a specific numerical example for comprehension of the invention, but numerical values are illustrative only, and arbitrary appropriate values may be used unless otherwise stated. The classification of the items in the above description is not essential in the invention, and details described in two or more items may be used in combination as necessary. In addition, details described in any item may be applied to details described in a different item (as long as inconsistency does not occur). It cannot be said that the boundary of the function units in the functional block diagram or the processing units correspond to a boundary of physical components. Operations of a plurality of function units may be performed physically with one component, or an operation of one function unit may be performed physically with a plurality of components. In the procedure described in this embodiment, a processing order may be changed as long as inconsistency does not occur. The user equipment 10 and the base station 20 have been described by using functional block diagrams for convenience of processing explanation, but the devices may be realized by hardware, software, or a combination thereof. Software that operates by the processor provided to the user equipment 10 in accordance with the embodiment of the invention, and software that operates by the processor provided to the base station 20 in accordance with the embodiment of the invention may be respectively stored in a random access memory (RAM), a flash memory, a read only memory (ROM), an EPROM, an EEPROM, a register, a hard disk drive (HDD), a removable disk, a CD-ROM, a database, a server, or other appropriate storage media.

Information notification may be performed by other methods without limitation to the aspect and the embodiment described in this specification. For example, the information notification may be performed by physical layer signaling (for example, downlink control information (DCI), and uplink control information (UCI)), higher layer signaling (for example, radio resource control (RRC) signaling, medium access control (MAC) signaling, and broadcast information (master information block (MIB) and system information block (SIB))), other signals, or a combination thereof. In addition, the RRC signaling may be referred to as an RRC message, and examples thereof include an RRC connection setup message, an RRC connection reconfiguration message, and the like.

The aspect and the embodiment which are described in this specification may be applied to long term evolution (LTE), LTE-Advanced (LTE-A), SUPER 3G, IMT-Advanced, 4G, 5G, future radio access (FRA), W-CDMA (registered trademark), GSM(registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), other systems which use a suitable system, and/or a next generation system that is extended on the basis of the systems.

In the procedure, the sequence, the flowchart, and the like in the aspect and the embodiment which are described in this specification, the order thereof may be changed as long as inconsistency does not occur. For example, with regard to the method that is described in this specification, elements of various steps are suggested in an exemplary order, and there is no limitation to the specific order that is suggested.

In this specification, a specific operation that is performed by the base station 20 may be performed by a higher node (upper node) according to circumstances. In a network including one or a plurality of network nodes including the base station 20, it is apparent that various operations which are performed for a communication with a user equipment 10 can be performed by the base station 20 and/or another network node (for example, MME, S-GW, and the like are considered, but there is no limitation thereto) other than the base station 20. In the above description, a case where another network node other than the base station 20 is one is exemplified, but a combination (for example, MME and S-GW) of a plurality of other network nodes is also possible.

The aspects and the embodiment described in this specification may be used alone or in combination thereof, or may be switched and used in accordance with execution.

The user equipment 10 may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other suitable terms by those skilled in the art.

The base station 20 may be referred to as a NodeB (NB), an enhanced NodeB (eNB), or several other suitable terms by those skilled in the art.

The term "determining" that is used in this specification may include various operations. For example, the term "determining" may include regarding of judging, calculating, computing, processing, deriving, investigating, looking up (for example, looking up in a table, a database, or other data structures), or ascertaining as "determined", and the like. In addition, the "determining" may include regarding of receiving (for example, information receiving), transmitting (for example, information transmitting), input, output, or accessing (for example, accessing to data in a memory) as "determined", and the like. In addition, "determining" may include regarding of resolving, selecting, choosing, establishing, comparing, or the like as "determining". That is, "determining" includes regarding of any operation as "determined".

Description of "on the basis of" in this specification does not represent "only on the basis of" unless otherwise stated. In other words, description of "on the basis of" represents both "only on the basis of" and "at least on the basis of".

In a case where "include", "including", and a modification thereof are used in this specification and the appended claims, these terms are intended as comprehensive terms similar to "including (comprising)". In addition, a term ("or") that is used in this specification and the appended claims is not intended as an exclusive logical sum.

In the entirety of the present disclosure, for example, in a case where articles such as "a", "an", and "the" are added in translation, the articles are intended to include a plural form as long as the opposite intention is not clearly indicated from the context.

Hereinbefore, the invention has been described in detail, but it is apparent by those skilled in the art that the invention is not limited to the above-described embodiment in this specification. The invention can be executed a variation aspect and a modification aspect without departing from the gist or the scope of the invention which is determined by description of the appended claims. Accordingly, description in this specification is made for exemplary explanation, and does not have any limiting meaning with respect to the invention.

This application is based on and claims priority to Japanese patent application No. 2016-192357 filed on Sep. 29, 2016, and Japanese patent application No. 2016-203120 filed on Oct. 14, 2016, and the entire contents of the Japanese Patent Application No. 2016-192357 and Japanese patent application No. 2016-203120 are incorporated herein by reference.

EXPLANATIONS OF LETTERS OR NUMERALS

10 User equipment
20 Base station
101 Signal transmission unit
102 Signal reception unit
103 Resource control unit
201 Signal transmission unit
202 Signal reception unit
203 Resource control unit
204 Resource allocation unit
1001 Processor
1002 Memory
1003 Storage
1004 Communication device
1005 Input device
1006 Output device

The invention claimed is:

1. A terminal comprising:
   a transmitter that transmits, to a base station, capability information of a maximum bandwidth that the terminal supports; and
   a receiver that receives, from the base station, a frequency of a synchronization signal that the terminal uses, and information that designates a bandwidth part of downlink that the terminal uses,
   wherein a bandwidth of the bandwidth part of downlink is configurable in units of resource blocks.

2. The terminal as claimed in claim 1,
   wherein the information that designates the bandwidth part of downlink includes a frequency domain location and a bandwidth of the bandwidth part.

3. The terminal as claimed in claim 2,
   wherein the receiver receives information that designates a bandwidth part of uplink that the terminal uses.

4. The terminal as claimed in claim 2, wherein a bandwidth of the bandwidth part is a bandwidth determined by the base station based on the capability information.

5. The terminal as claimed in claim 1,
   wherein the receiver receives information that designates a bandwidth part of uplink that the terminal uses.

6. The terminal as claimed in claim 5, wherein a bandwidth of the bandwidth part is a bandwidth determined by the base station based on the capability information.

7. The terminal as claimed in claim 1, wherein a bandwidth of the bandwidth part is a bandwidth determined by the base station based on the capability information.

8. A communication method executed by a terminal, comprising:
   transmitting, to a base station, capability information of a maximum bandwidth that the terminal supports; and
   receiving, from the base station, a frequency of a synchronization signal that the terminal uses, and information that designates a bandwidth part of downlink that the terminal uses,
   wherein a bandwidth of the bandwidth part of downlink is configurable in units of resource blocks.

9. A base station comprising:
   a receiver that receives, from a terminal, capability information of a maximum bandwidth that the terminal supports; and
   a transmitter that transmits, to the terminal, a frequency of a synchronization signal that the terminal uses, and information that designates a bandwidth part of downlink that the terminal uses,
   wherein a bandwidth of the bandwidth part of downlink is configurable in units of resource blocks.

10. A system comprising:
    a terminal comprising:
    a transmitter that transmits, to a base station, capability information of a maximum bandwidth that the terminal supports; and a receiver that receives, from the base station, a frequency of a synchronization signal that the terminal uses, and information that designates a bandwidth part of downlink that the terminal uses, and the base station comprising:
　a receiver that receives, from the terminal, the capability information; and
　a transmitter that transmits, to the terminal, the frequency of the synchronization signal that the terminal uses, and the information that designates the bandwidth part of downlink that the terminal uses, wherein a bandwidth of the bandwidth part of downlink is configurable in units of resource blocks.

\* \* \* \* \*